(12) United States Patent
Fujikawa et al.

(10) Patent No.: US 9,395,541 B2
(45) Date of Patent: Jul. 19, 2016

(54) HEAD-UP DISPLAY APPARATUS

(71) Applicant: DENSO CORPORATION, Kariya, Aichi-pref. (JP)

(72) Inventors: Takayuki Fujikawa, Nagoya (JP); Hiroshi Ando, Nagoya (JP); Masayuki Yamaguchi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 62 days.

(21) Appl. No.: 14/334,745

(22) Filed: Jul. 18, 2014

(65) Prior Publication Data

US 2015/0042542 A1 Feb. 12, 2015

(30) Foreign Application Priority Data

Aug. 8, 2013 (JP) ................................ 2013-165415

(51) Int. Cl.
*G02B 27/01* (2006.01)
*G02B 5/02* (2006.01)

(52) U.S. Cl.
CPC .............. *G02B 27/0101* (2013.01); *G02B 5/02* (2013.01); *G02B 2027/0112* (2013.01); *G02B 2027/0118* (2013.01)

(58) Field of Classification Search
CPC ...... G02B 27/01; G02B 27/0101; G02B 5/02; G02B 2027/0112; G02B 2027/0118
See application file for complete search history.

(56) References Cited

U.S. PATENT DOCUMENTS

| 2005/0128595 | A1 | 6/2005 | Shimizu | |
|---|---|---|---|---|
| 2007/0103747 | A1* | 5/2007 | Powell | G02B 13/22 359/13 |
| 2007/0238296 | A1 | 10/2007 | Shimizu | |
| 2009/0135374 | A1 | 5/2009 | Horiuchi et al. | |
| 2010/0157424 | A1* | 6/2010 | Katsuma | G03B 21/60 359/455 |
| 2012/0236046 | A1* | 9/2012 | Sugiyama | G02B 27/01 345/690 |
| 2013/0050834 | A1* | 2/2013 | Fujikawa | G02B 27/0101 359/630 |

FOREIGN PATENT DOCUMENTS

WO 2014-122912 A1 8/2014

OTHER PUBLICATIONS

Korean Office Action mailed on Aug. 21, 2015 in the corresponding KR application No. 10-2014-0101440. ( English translation attached).

* cited by examiner

*Primary Examiner* — Lixi C Simpson
(74) *Attorney, Agent, or Firm* — Posz Law Group, PLC

(57) ABSTRACT

A head-up display apparatus includes a projector that projects a laser beam and a screen including a plurality of optical elements that are arranged in a grid pattern. The screen diffuses the laser beam, which has entered into the plurality of optical elements from the projector, toward the projection plane. Each of the plurality of optical elements has a curved surface formed into a convex or a concave shape on an outside surface of the screen. One of the plurality of optical elements has a thickness at a curvature center point that is different from that of the other of the plurality of optical elements immediately adjacent to the one of the plurality of optical elements.

12 Claims, 30 Drawing Sheets

COMPARATIVE EXAMPLE

HEAD-UP DISPLAY APPARATUS

CROSS REFERENCE TO RELATED APPLICATION

This application is based on and incorporates herein by reference Japanese Patent Application No. 2013-165415 filed on Aug. 8, 2013.

TECHNICAL FIELD

The present disclosure relates to a head-up display apparatus that displays a virtual image of a display image by projecting the display image to a projection plane in an interior of a vehicle.

BACKGROUND

A head-up display apparatus (hereinafter "HUD apparatus") providing a virtual image of a display image produces by a laser beam (light beam) by diffusing the laser beam with a screen toward a projection plane has been conventionally known.

For example, a HUD apparatus disclosed in a patent document 1 diffuses a laser beam, which is projected from a projector to a screen, with a plurality of optical elements arranged in a grid pattern. The laser beam diffused and projected on a projection plane is visible as a virtual image of a display image for a viewer in an interior of a vehicle.

However, when a high coherence laser beam is projected toward and diffused with the optical elements having a regular pattern of the grid arrangement, the virtual image having luminance irregularity may be produced (i.e., not uniformly illuminated).

SUMMARY

The present disclosure is made in light of the above, and an object of the present disclosure is to provide a HUD apparatus that displays a virtual image with low luminance irregularity.

In a first aspect of the present disclosure, a head-up display apparatus includes a projector projecting a light beam and a screen including a plurality of optical elements that are arranged in a grid pattern on an outside surface of the screen. The screen diffuses the light beam projected from the projector toward the projection plane. Each of the plurality of optical elements has a curved surface having a convex or a concave shape. The light beam is diffused through the curved surface. One of the plurality of optical elements has a thickness at a curvature center point of the curved surface that is different from that of an other of the plurality of optical elements that is immediately adjacent to the one of the plurality of optical elements.

According to the first aspect of the present disclosure, the adjacent optical elements have curved surfaces on the outside surface of the screen that are formed in the convex shape or the concave shape, and the light beam is emitted from the outside surface through the curved surface. Therefore, an intensity distribution of a diffracted light generated by interference between the light beams has multiple diffraction peaks in different orders according to emission angles. However, since the thicknesses of the adjacent optical elements at the curvature center point are different from each other, the diffraction peaks of the diffracted lights generated by one optical element and other optical elements on both sides of the one optical element are shifted each other. As a result, the diffraction peaks generated by the one optical element and the other optical element on one side of the one optical element are superposed with diffraction valleys generated by the one optical element and the other optical element on the other side of the one optical element. Accordingly, luminance irregularity in the diffracted lights recognized by a viewer as a virtual image can be suppressed.

In a second aspect of the present disclosure, the outside surface includes a receiving surface into which the light beam enters and an emitting surface from which the light beam is emitted. The curved surface is formed on at least one of the receiving surface and the emitting surface. "m" is defined as an odd numerical value greater than or equal to 1, "$\lambda$" is defined as a wavelength of the light beam, "n" is defined as a refractive index of the plurality of optical elements, and a difference between the thickness of the one of the plurality of optical elements and the thickness of the other of the plurality of optical elements is defined as $\Delta T$. A numerical formula as provided below is satisfied.

$$\Delta T \neq \frac{1}{n-1} \cdot m \cdot \frac{\lambda}{2}$$

The light beams are diffused by the screen when entering through the curved surfaces of the plurality of optical elements. Therefore, when the difference $\Delta T$ between the thicknesses of the adjacent optical elements is equal to $\{1/(n-1)\} \cdot m \cdot \lambda/2$, the diffraction peaks generated by one optical element and the other optical elements on both sides of the one optical element may be superposed each other. However, according to the second aspect of the present disclosure, since the difference $\Delta T$ is not equal to $\{1/(n-1)\} \cdot m \cdot \lambda/2$, the superposition of the diffracted peaks can be prevented. As a result, the luminance irregularity recognized by a viewer can be surely suppressed.

In a third aspect of the present disclosure, the one of the plurality of optical elements has a width that is different from that of the other of the plurality of optical elements.

According to the third aspect of the present disclosure, the light beams emitted through the boundary between the adjacent optical elements interfere with each other by diffraction. Therefore, even when the fluctuating intensity distributions of the emitting beams of the adjacent optical elements are generated, the fluctuating intensity distributions are shifted each other according to the difference of the widths of the optical elements. As a result, a viewer recognizes the emitting beams, which are emitted from the adjacent optical elements and have the intensity distribution shifted each other, whereby further suppressing the luminance irregularity.

BRIEF DESCRIPTION OF THE DRAWINGS

The disclosure, together with additional objectives, features and advantages thereof, will be best understood from the following description, the appended claims and the accompanying drawings, in which:

Hereinafter, a plurality of embodiments of the present disclosure will be described with reference to the accompanying drawings. In each embodiment, the same reference signs are assigned to corresponding configuration elements, and there is a case where duplicated descriptions are omitted. In each embodiment, when only a part of a configuration of an embodiment is described, a corresponding configuration of another embodiment, which is previously described, is applicable to the other part of the configuration of the embodiment. Insofar as there are no problems with a combination of the configurations, not only can the configurations be combined together as stated in each embodiment, but also the configurations of the plurality of embodiments can be partially combined together even though the partial combinations of the configurations are not stated.

(First Embodiment)

Figure 1:
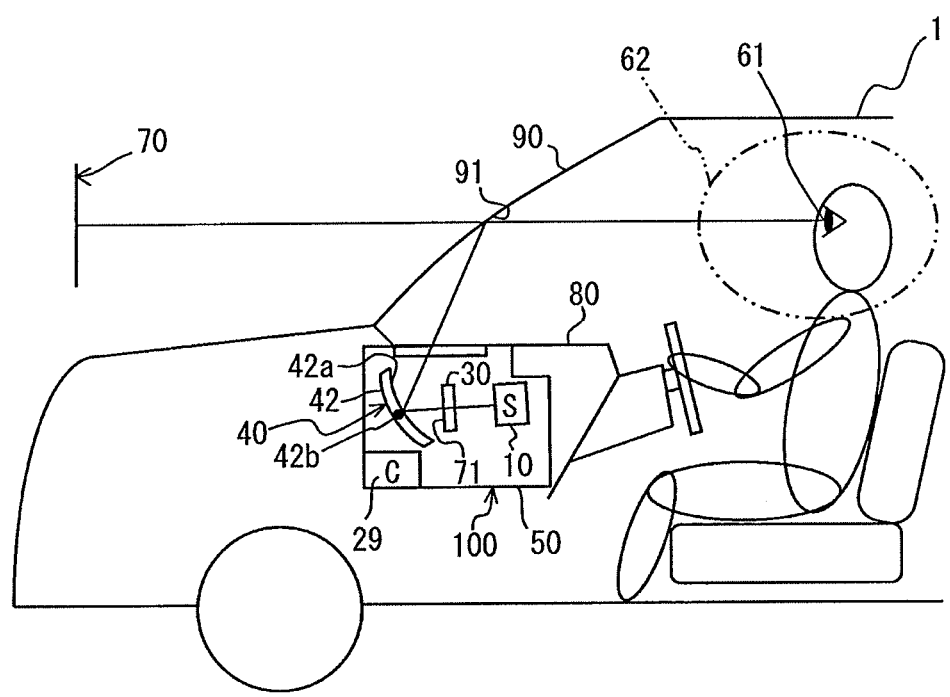
FIG. 1 is a diagram schematically illustrating a vehicle equipped with a HUD apparatus according to a first embodiment.

As shown in FIG. 1, a HUD apparatus 100 of the first embodiment is installed in an automobile as a "vehicle" and is housed within an instrument panel 80. The HUD apparatus 100 projects a display image 71 toward a wind shield 90 as a "display element" of the vehicle 1. In the vehicle 1, a projection plane 91 is formed on an inside surface of the wind shield 90 that is exposed to a vehicle interior. The projection plane 91 is formed into a concave surface or a flat surface. The wind shield 90 may have an angle difference between an outside surface, which is exposed to an outside of the vehicle interior, and the inside surface to suppress an optical path difference. Alternately, the wind shield 90 may have a vapor-deposited sheet or a film on the inside surface of the wind shield 90.

Figure 2:
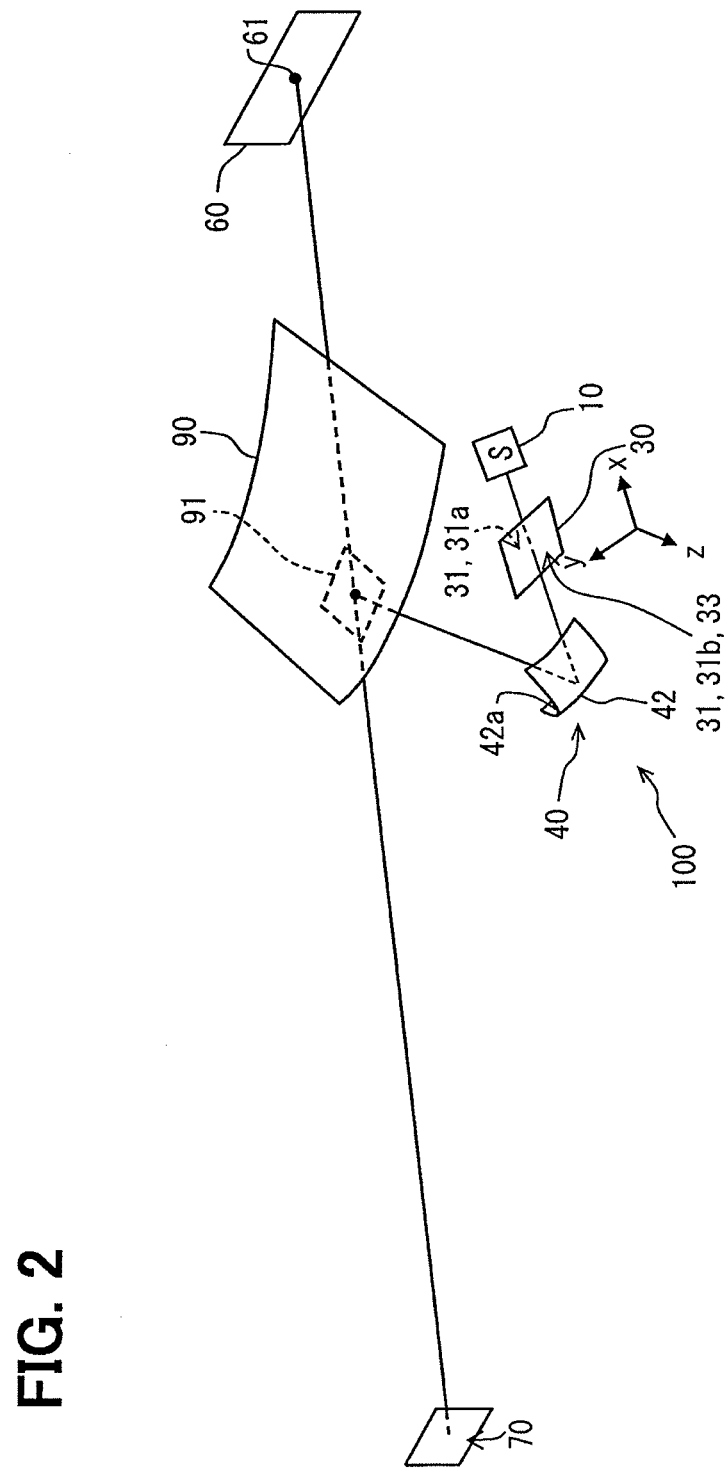
FIG. 2 is a perspective diagram schematically illustrating the HUD apparatus according to the first embodiment.

In the vehicle interior, luminous flux of the display image 71 reflected by the projection plane 91 reaches an eye point 61 of a viewer. The viewer visually recognizes a virtual image 70 of the display image 71 in front of the wind shield 90 when the viewer recognizes the luminous flux. The recognition of the virtual image 70 can be realized only when the eye point 61 of the viewer is within a visual region 60 as shown in FIG. 2.

Figure 3:
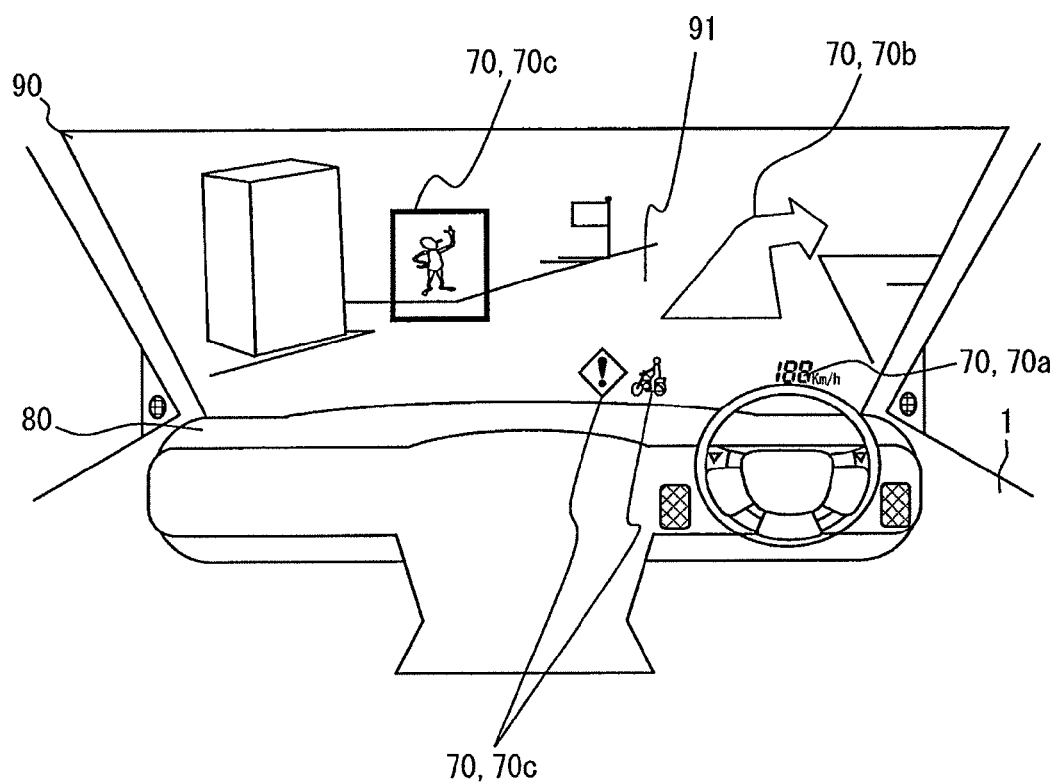
FIG. 3 is a diagram schematically illustrating the HUD apparatus displaying a display image inside of a vehicle interior according to the first embodiment.

As described above, the HUD apparatus 100 displays the virtual images 70 of the display images 71 by projecting the display images 71 toward the projection plane 91 and the viewer inside the vehicle interior visually recognizes the virtual images 71 as shown in FIG. 3. It should be noted that the virtual images 70 may include an indication image 70a of a vehicle speed, an indication image 70b of a travelling direction of the vehicle 1 based on a navigation system, a warning image 70c, etc.

(Entire Configuration of HUD Apparatus)

Next, an entire configuration of the HUD apparatus 100 will be described below. As shown in FIG. 1, the HUD apparatus 100 includes a laser scanner 10, a controller 29, a screen 30, an optical system 40 in a housing 50.

Figure 4:
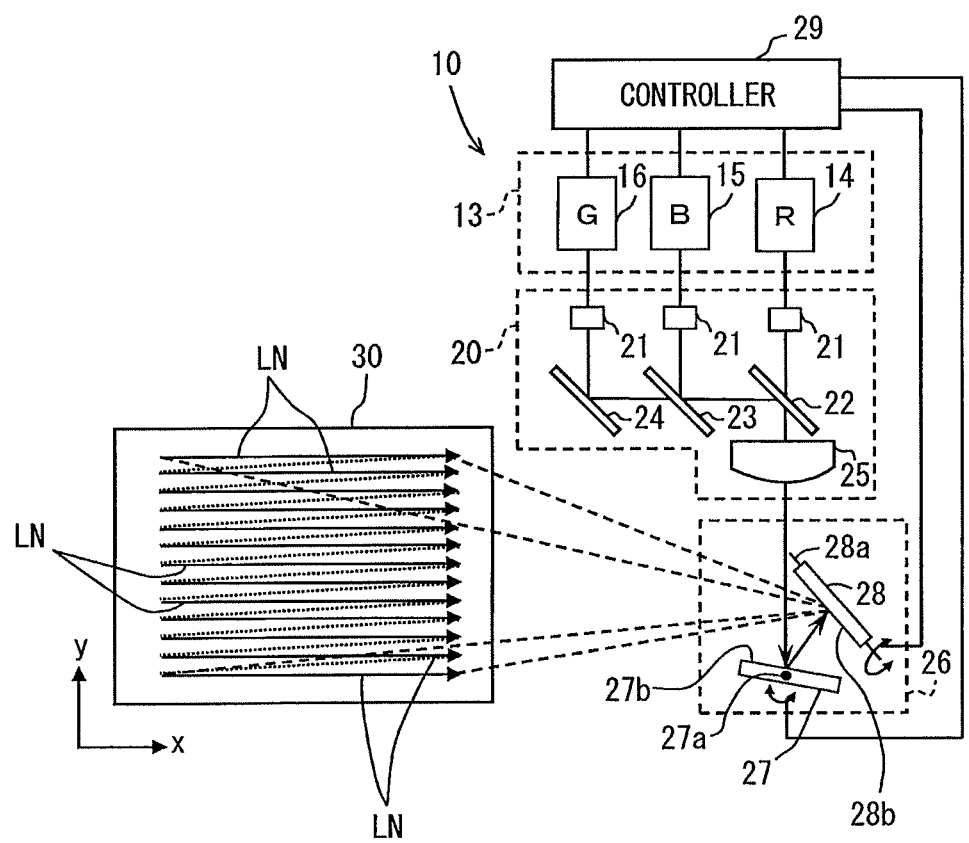
FIG. 4 is a diagram illustrating the HUD apparatus according to the first embodiment.

As shown in FIG. 4, the laser scanner 10 as a "projector" includes a light source 13, a light guide portion 20 and a micro electro mechanical system (MEMS) 26.

The light source 13 has three laser projectors 14, 15 and 16. Each laser projector 14, 15, 16 is electrically connected to the controller 29 and projects a laser beam (i.e., light beam) having a single wavelength according to control signals from the controller 29. The laser beam projected from one laser projector 14, 15, 16 has a color phase different from that of an other laser projector 14, 15, 16. More specifically, the laser projector 14 projects a red laser beam having a peak wavelength within, for example, 600 to 650 nm (preferably 640 nm). The laser projector 15 projects a blue laser beam having a peak wavelength within, for example, 430 to 470 nm (preferably 450 nm). The laser projector 16 projects a green laser beam having a peak wavelength within, for example, 490 to 530 nm (preferably 515 nm). Thus, a variety of colors can be generated by mixing three color laser beams projected from the laser projectors 14, 15 and 16.

The light guide portion 20 includes three collimating lenses 21, three dichroic filters 22, 23 and 24 and a condensing lens 25. Each collimating lens 21 is arranged with an interval (e.g., 0.5 mm) relative to the projector 14, 15, 16 in a projecting direction of the laser beam. Each collimating lens 21 collimates the laser beam into a parallel beam by refracting the laser beam.

Each dichroic filter 22, 23, 24 is arranged downstream of the corresponding collimating lens 21 with an interval (e.g., 4 mm). Each dichroic filter 22, 23, 24 partially reflects and partially transmits the laser beam from the corresponding collimating lens 21. In other words, the dichroic filter 22, 23, 24 reflects the laser beam having a specific wavelength and transmits the laser beam having a wavelength other than the specific wavelength. Specifically, the dichroic filter 22 corresponding to the laser projector 14 transmits only the red laser beam and reflects other color laser beams. The dichroic filter 23 corresponding to the laser projector 15 reflects only the blue laser beam and transmits other color laser beams. The dichroic filter 24 corresponding to the laser projector 16 reflects only the green laser beam and transmits other color laser beams.

The dichroic filter 23 is positioned a distance (e.g., 6 mm) from the dichroic filter 24 in a reflecting direction of the green laser beam by the dichroic filter 24. The dichroic filter 22 is positioned a distance (e.g., 6 mm) from the dichroic filter 23 in a reflecting direction of the blue laser beam by the dichroic filter 23 (i.e., a transmitting direction of the green laser beam through the dichroic filter 23). The condensing lens 25 is positioned a distance (e.g., 4 mm) from the dichroic filter 22 in a transmitting direction of the red laser beam through the dichroic filter 22 (i.e., a reflecting direction of the blue laser beam and the green laser beam by the dichroic filter 22). By these configurations, the red laser beam, which has passed through the dichroic filter 22, and the blue laser beam and the green laser beam, which have been reflected by the dichroic filter 22 after being reflected respectively by the dichroic filters 23 and 24, are mixed by entering into the condensing lens 25.

The condensing lens 25 is a plano-convex lens having a flat incident surface and a convex emitting surface. The condensing lens 25 focuses the laser beam entering into the incident surface by refracting. As a result, the laser beam is emitted from the condensing lens 25 toward the MEMS 26.

The MEMS 26 includes a first scanning mirror 27, a second scanning mirror 28 and a driving member (not shown) for the first and second scanning mirrors 27 and 28. The first scanning mirror 27 includes an opposing surface facing the condensing lens 25 and having a center portion with an interval (e.g., 5 mm) relative to the condensing lens 25. A reflecting surface 27b is formed on the opposing surface of the first scanning mirror 27 by metal vapor deposition using aluminum. The second scanning mirror 28 includes an opposing surface facing the first scanning mirror 27 and having a center portion with an interval (e.g., 1 mm) relative to the first scanning mirror 27. A reflecting surface 28b is formed on the opposing surface of the second scanning mirror 28 by metal vapor deposition using aluminum. The driving member for the MEMS 26 is electrically connected to the controller 29 and drives individually the scanning mirrors 27 and 28 to rotate about respective rotational axes 27a and 28a according to control signals from the controller 29.

A center portion of the second scanning mirror 28 is disposed with an interval (e.g., 100 mm) relative to the screen 30. The laser beam sequentially enters into the scanning mirrors 27 and 28 from the condensing lens 25 and then is reflected sequentially by the reflecting surfaces 27b and 28b. As a result, the laser beam is projected toward the screen 30 from the MEMS 26.

Figure 5:
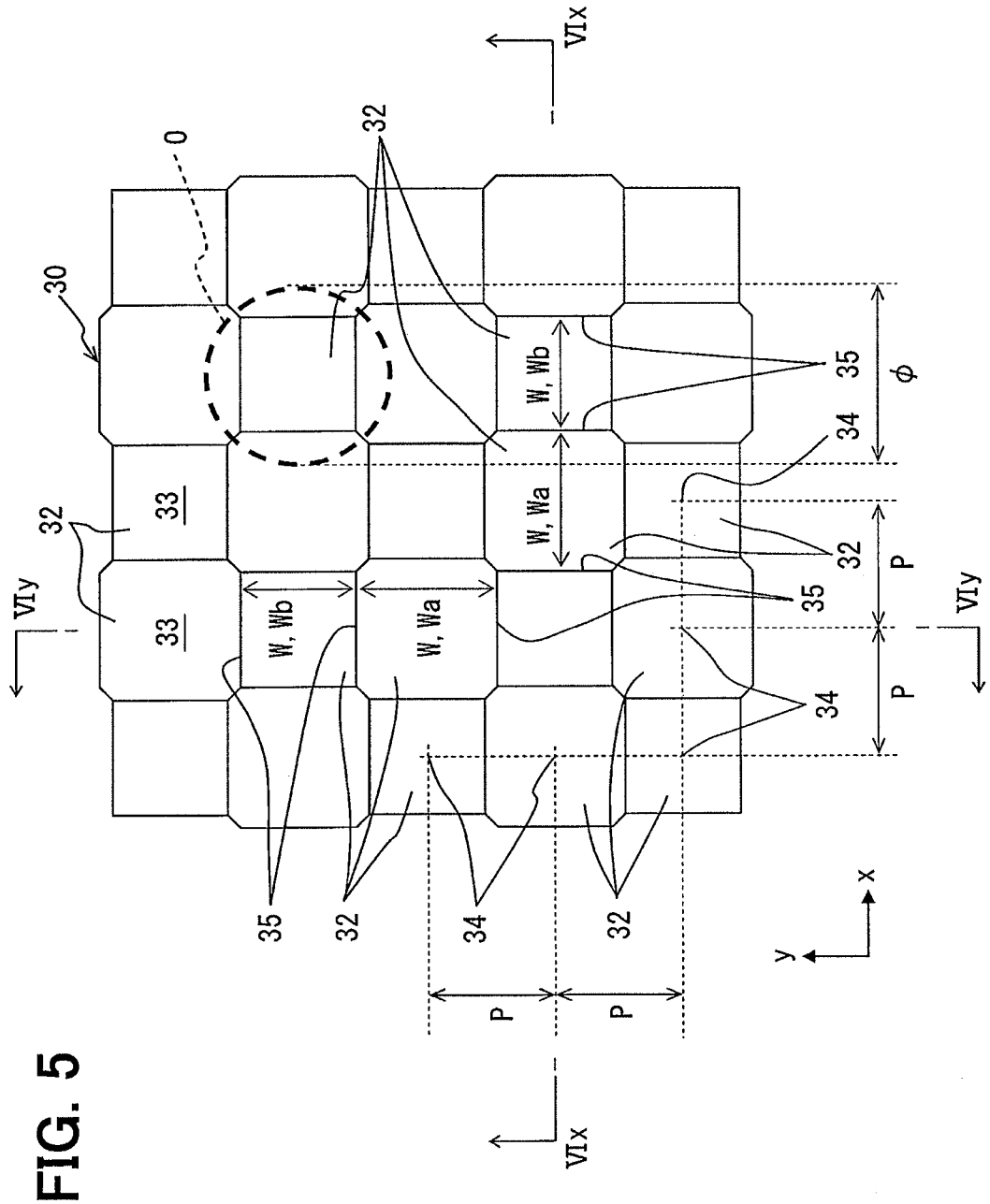
FIG. 5 is a diagram partially illustrating a screen according to the first embodiment.

The controller 29 is a control circuit having a processor. The controller 29 outputs the control signals to each laser projector 14, 15, 16, and each laser projector 14, 15, 16 intermittently projects the laser beam like a pulsed light. The controller 29 outputs the control signals to the driving member of the scanning mirrors 27 and 28. Receiving the control signals, the scanning mirrors 27 and 28 change the projecting directions of the laser beams relative to the screen 30 to directions indicated by arrows in FIG. 4 along plural scanning lines LN. Therefore, as shown in FIG. 5, the display image 71 is displayed by moving a projection region O where the laser beam is projected in a circular spot shape on the screen 30. That is, the laser beam projected from the laser scanner 10 becomes the display image 71 by being scanned in a horizontal direction x and a perpendicular direction y (i.e., perpendicular to the horizontal direction x). The display image 71 is formed as an image having, for example, 480 pixels in the horizontal direction x and 240 pixels in the perpendicular direction y with 60 frames per second on the screen 30. It should be noted that the horizontal direction x is parallel to a horizontal direction of the vehicle 1 and the perpendicular direction y may be angled relative to a vertical direction of the vehicle 1 or parallel to the vertical direction (refer to FIG. 2).

Figure 6:
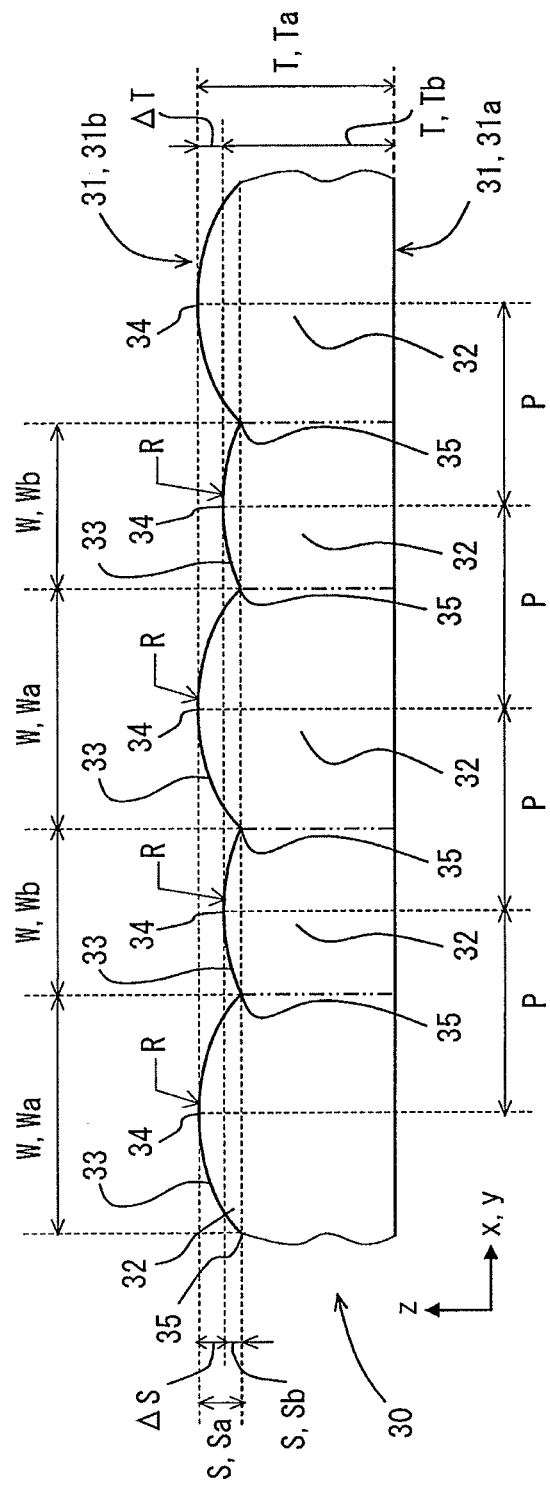
FIG. 6 is a cross-sectional view taken along the line VIx-VIx and the line VIy-VIy of FIG. 5 which partially illustrates the screen according to the first embodiment.

As shown in FIGS. 5 and 6, the screen 30 is made of resin, such as polycarbonate, or glass having translucency. The screen 30 is formed into a plate shape having a thickness of 2 to 5 mm, for example. The screen 30 is disposed between the laser scanner 10 and a concave mirror 42 (refer to FIGS. 1 and 2). The screen 30 has a plurality of optical elements 32 that are arranged in a grid pattern in the horizontal direction x and the perpendicular direction y to form a microlens array. Each optical element 32 diffuses and emits the laser beam when the laser beam passes through the optical elements 32. As shown in FIG. 5, a diameter of the projection region O is equal to or greater than a half value of an element width W (i.e., width) of each optical element 32. In the first embodiment, the diameter of the projection region O is also equal to or greater than a half value of a small element width Wb as described below. The screen 30 is formed as a single component as shown in FIG. 6. Alternately, the screen 30 may be separately formed as a film and disposed on a substrate. Hereinafter, one of outside surface 31 of the screen 30, into which the laser beam enters, is referred to as "receiving surface 31a" and the other of outside surface 31, from which the laser beam is emitted, is referred to as "emitting surface 31b".

As shown in FIGS. 1 and 2, the optical system 40 includes the concave mirror 42 and a driving portion (not shown) for the optical system 40. The concave mirror 42 is formed by, for example, vapor-depositing of aluminum on a surface of a resin substrate or a glass substrate. The concave mirror 42 guides the laser beam toward the projection plane 91 to display the display image 71 by reflecting the laser beam, which has been diffused by the screen 30, with a reflecting surface 42a of the concave mirror 42. The reflecting surface 42a has a center portion that is recessed in a direction away from the screen 30 and the projection plane 91. That is, the reflecting surface 42a is formed into a smoothly curved surface to magnify the display image 71.

The driving portion of the optical system 40 is electrically connected to the controller 29 and swings the concave mirror 42 around a swinging shaft 42b (shown in FIG. 1) according to control signals from the controller 29. By the swinging of the concave mirror 42, the visual region 60 moves upwardly and downwardly according to the movements of the imaging position of the virtual image 70 in upward and downward directions. The position of the visual region 60 is set in consideration of "an eyelips 62". The eyelips 62 (or eye range) represents a space region where the eye point 61 of a viewer sitting on a driving seat can exist. Therefore, the visual region 60 is set such that at least a portion of the visual region 60 is within the eyelips 62 while the visual region 60 moves according to the swinging of the concave mirror 42.

It should be noted that the optical system 40 may include an optical component instead of the concave mirror 42 or in addition to the concave mirror 42. Further, the laser beam may be directly projected toward the projection plane 91 without the optical system 40 (the concave mirror 42) after diffusing the laser beam by each optical element 32.

(Detailed Description of Optical Element)

Next, the detailed description of the optical element 32 of the first embodiment will be described below.

As shown in FIGS. 5 and 6, each optical element 32 has a curved surface 33 on the outside surface 31 of the screen 30. The respective curved surfaces 33 of the optical elements 32 are formed into a convex shape. The curved surface 33 of the first embodiment is not formed on the receiving surface 31a but on the emitting surface 31b. The curved surface 33 protrudes toward the laser scanner 10 and the optical system 40 in an orthogonal direction z (i.e., thickness direction) perpendicular to both the directions x and y (refer to FIG. 2). The curved surface 33 has an apex 34 (i.e., curvature center point) on the top of the curved surface 32. A boundary line 35 is formed between the optical elements 32 adjacent to each other in the direction x or y by overlapping peripheral edges of the optical elements 32 (i.e., outlines of the optical elements 32). As shown in FIG. 6, a distance between the apex 34 and the boundary line 35 (i.e., an infection point in a sectional view) in the thickness direction of the optical element 32 (i.e., the direction z) is defined as a "sag amount S".

The inventors of the present disclosure has studied and researched about the screen 30 in which the laser beam is diffused by and emitted from the curved surface 33 of each optical element 32. As a result, the inventors has found that diffracted light having an intensity distribution with multiple diffraction peaks in different orders according to emission angles is generated by interference between laser beams projected from the adjacent optical elements 32. Eventually the inventors have found the knowledge that a luminance irregularity is induced by the multiple diffractions.

Figure 7:
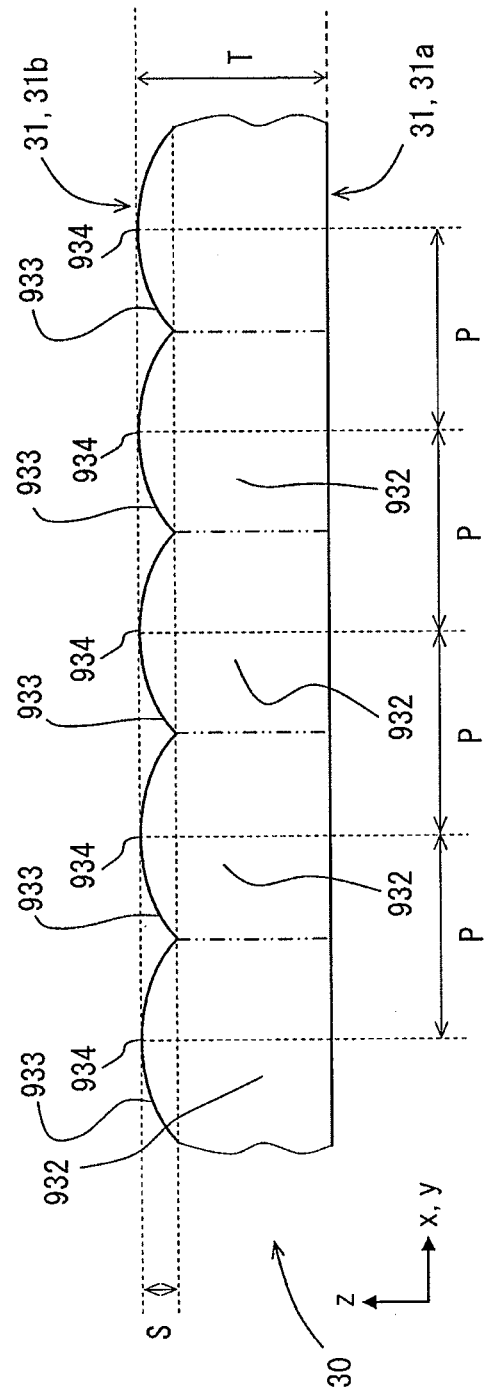
FIG. 7 is a cross-sectional view partially illustrating a screen according to a comparative example.
Figure 8:
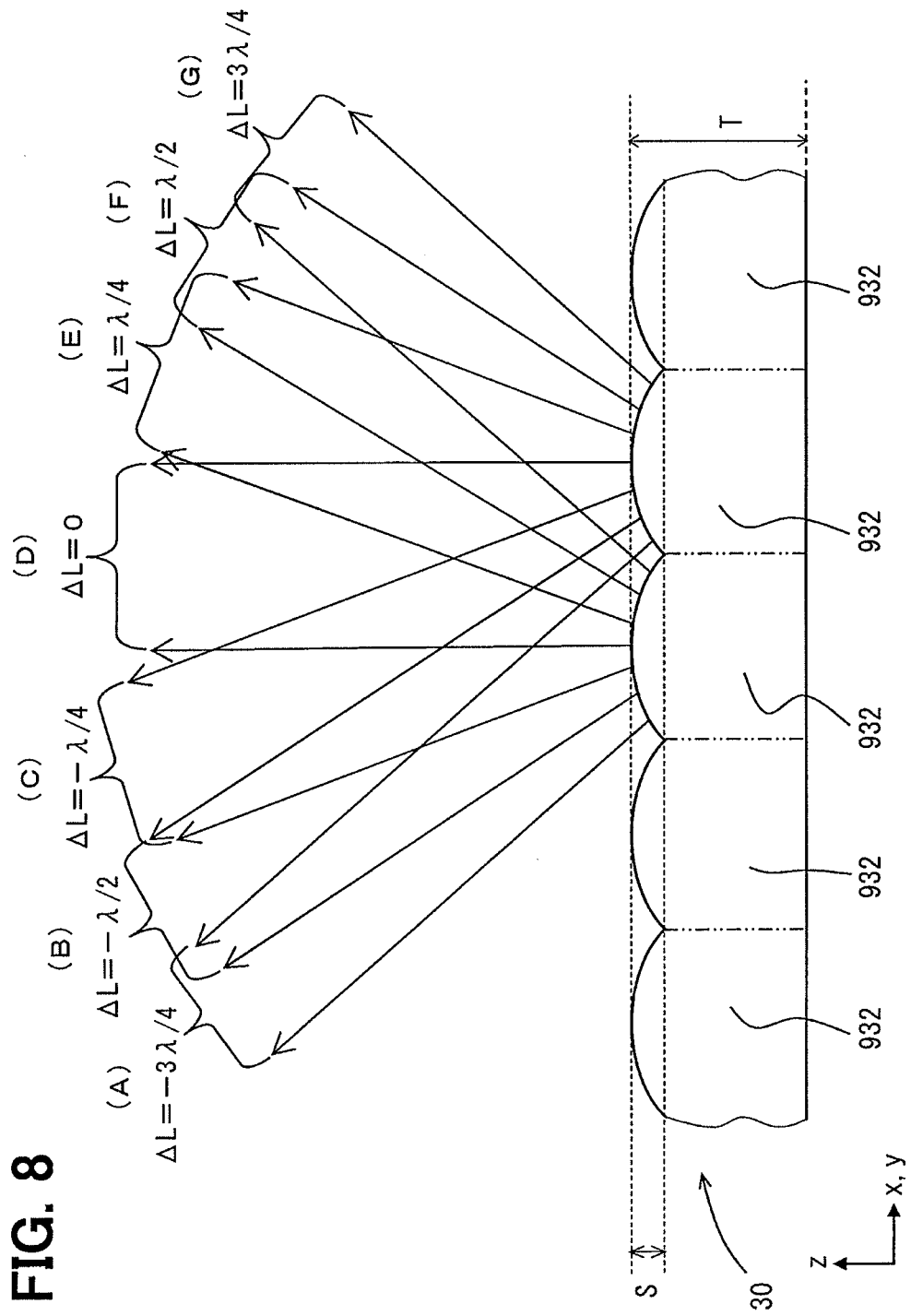
FIG. 8 is a diagram illustrating an optical path difference of emitted beams according to the comparative example.

Specifically, FIG. 7 shows a screen 30 of a comparative example having a constant sag amount S between the adjacent optical elements 932. As shown in FIG. 8, an optical path difference $\Delta L$ is generated between the laser beams, which are emitted from the adjacent optical elements 932 with an emission angle $\theta$ and interfere with each other. A distance between apexes 934 of the adjacent optical elements 932 is defined as a peak pitch P (refer to FIG. 7), the optical path difference $\Delta L$ is represented by a numerical formula 1 provided below using an approximation of $\sin \theta \approx \theta$ [rad]. Further, when a wavelength of the laser beam is defined as $\lambda$, an angle difference $\alpha$ of the emission angle $\theta$ corresponding to a change amount of the optical path difference $\Delta L$ for the wavelength $\lambda$, i.e., corresponding to the change of one order of the diffraction peak, is represented by a numerical formula 2 as provided below using the approximation of $\sin \alpha \approx \alpha$ and the peak pitch P.

$$\Delta L = P \cdot \theta \quad \text{[Numerical Formula 1]}$$

$$\alpha = \frac{\lambda}{P} \quad \text{[Numerical Formula 2]}$$

Figure 9:
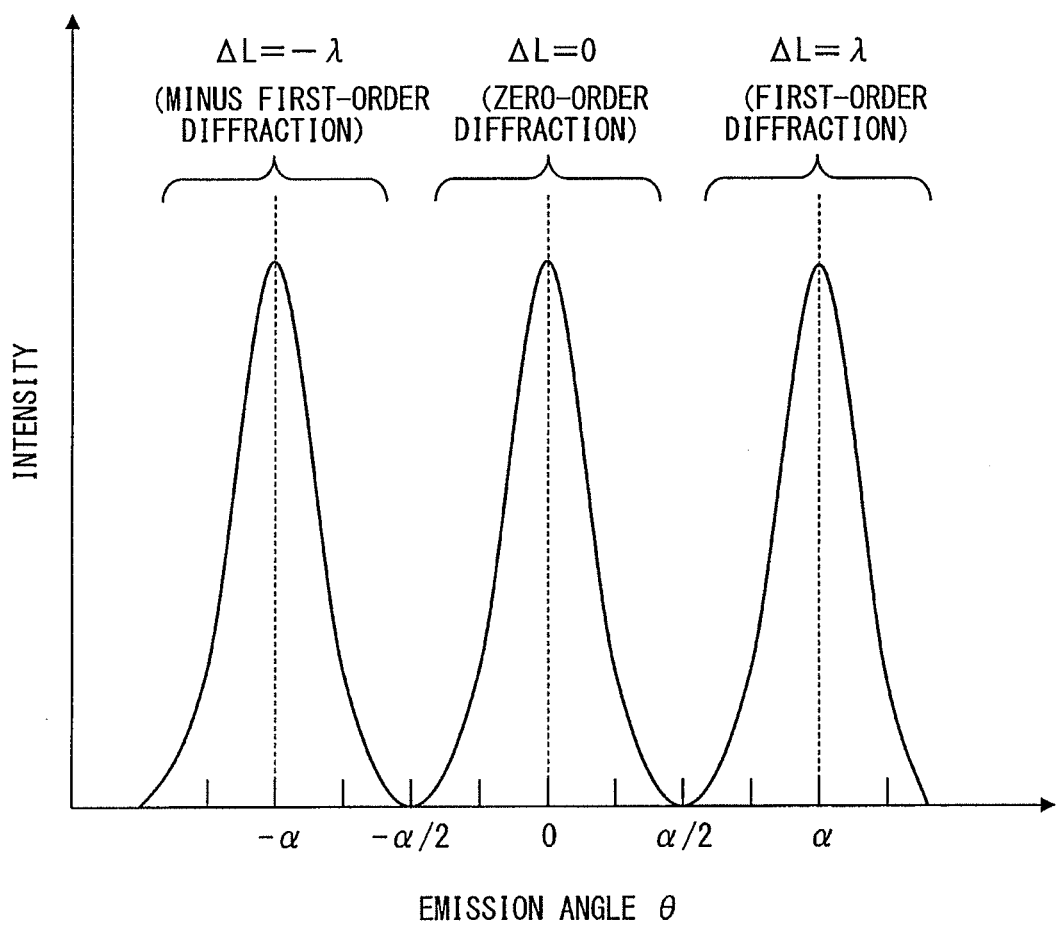
FIG. 9 is a diagram illustrating an intensity distribution of diffracted lights according to the comparative example.

FIG. 9 shows the intensity distribution of the comparative example when the optical path difference $\Delta L$ is $-\lambda$, 0, $+\lambda$, (i.e., the order of the diffraction peaks is $-1, 0, +1$) using the numerical formulas 1 and 2. As shown in FIG. 9, the intensity distribution changes according to the angle difference $\alpha$. In the intensity distribution, a center of the diffraction peak generated by one optical element 932 and the other optical elements 932 on both side of the one optical element 932 is shown when the emission angle $\theta$ is at $-\alpha$, 0, $+\alpha$. Furthermore, a center of a diffraction valley generated by the one optical element 932 and the other optical elements 932 on both side of the one optical element 932 is shown when the emission angle $\theta$ is at $-3\alpha/2$, $-\alpha/2$, $\alpha/2$, $3\alpha/2$. It should be noted that the diffraction valley corresponds to a valley between the diffraction peaks in the intensity distribution.

Figure 10:
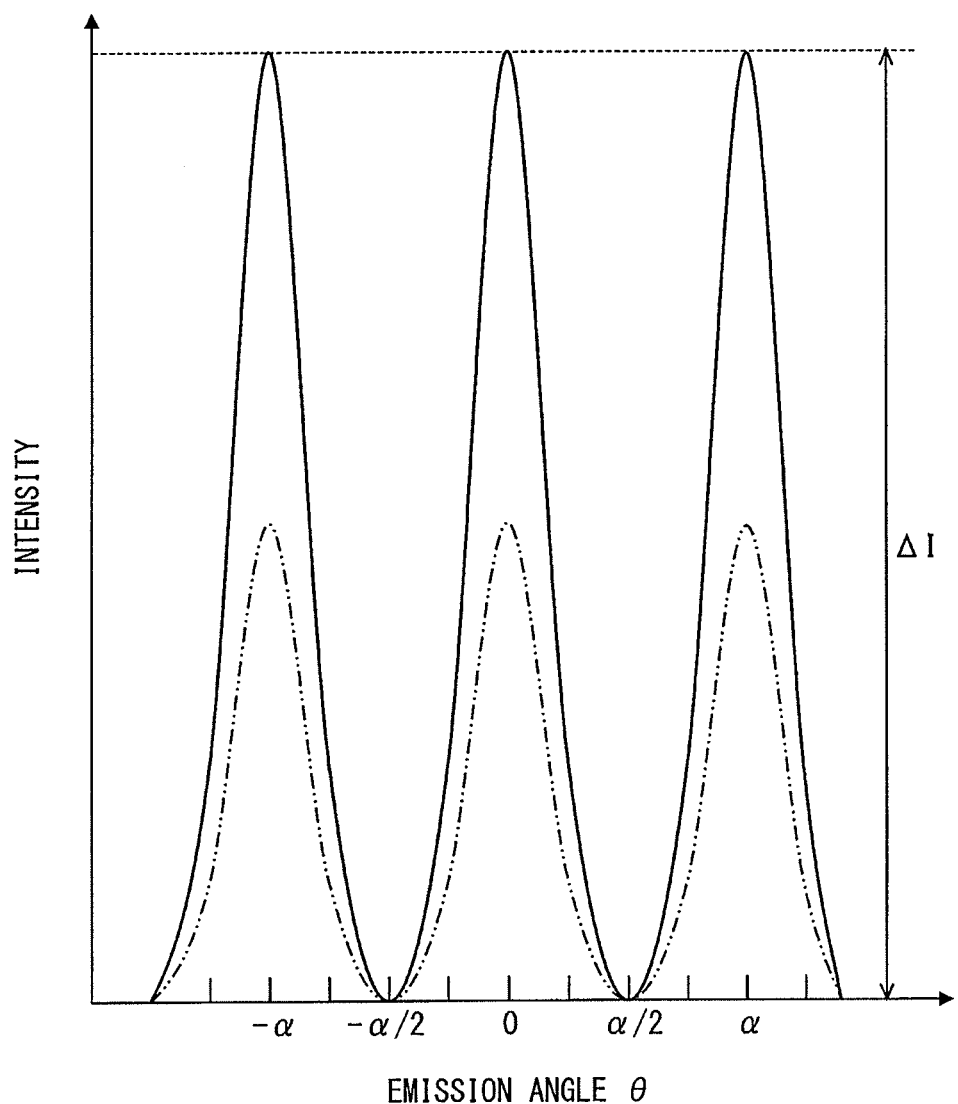
FIG. 10 is a diagram illustrating a superposition of the diffracted lights according to the comparative example.

FIG. 10 shows an intensity distribution (a solid line) by superposing diffracted lights (a two-dot dashed line) between the one optical element 932 and the other optical elements 932 on both side of the one optical element 932. In the intensity distribution shown in FIG. 10, the intensity difference $\Delta I$ between the diffraction peaks superposed (i.e., the emission angle $\delta$ is at $-\alpha$, 0, $+\alpha$) and the diffraction valleys superposed (i.e., the emission angle $\delta$ is at $-3\alpha/2$, $-\alpha/2$, $\alpha/2$, $3\alpha/2$) is increased. Thus, the viewer recognizes the luminance irregularity in the virtual image 70 according to the intensity difference $\Delta I$.

In contrast to the comparative example, according to the first embodiment, the sag amount S of one optical element 32 is different from that of the other optical elements 32 on both side of the one optical element 32. More specifically, in the first embodiment, the adjacent optical elements have two types of the sag amounts S (large sag amount Sa, small sag amount Sb). The optical element 32 having the large sag amount Sa and the optical element 32 having the small sag amount Sb are alternately arranged both in the direction x and the direction y. By this arrangement, a step $\Delta S$ of the sag amounts S (i.e., Sa–Sb) is formed between the large sag amount Sa and the small sag amount Sb in the direction z. In other words, the step $\Delta S$ is a difference between the sag amount Sa of one of the optical element 32 and the sag amount Sb of the other of the optical elements 32 adjacent to the one of the optical elements 32.

The thickness of the optical element 32 at the apex 34 in the direction z is defined as a thickness T. In the first embodiment, as shown in FIG. 6, the thickness T of one optical element 32 is different from that of the other optical elements 32 on both sides of the one optical element 32. In the first embodiment, there are two types of the thickness T (thicker thickness Ta, thinner thickness Tb). The optical element 32 having the thicker thickness Ta and the optical element 32 having the thinner thickness Tb are alternately arranged both in the direction x and the direction y.

In the first embodiment, the optical element 32 with the large sag amount Sa has the thicker thickness Ta, whereas the optical element 32 with the small sag amount Sb has the thinner thickness Tb. The step $\Delta S$ in the direction z is formed on the emitting surface 31b since the curved surface 33 is formed on the emitting surface 31b. Thus, when a thickness difference between the thicker thickness Ta and the thinner thickness Tb is defined as $\Delta T$, $\Delta T = \Delta S$ is substantially satisfied.

Figure 11:
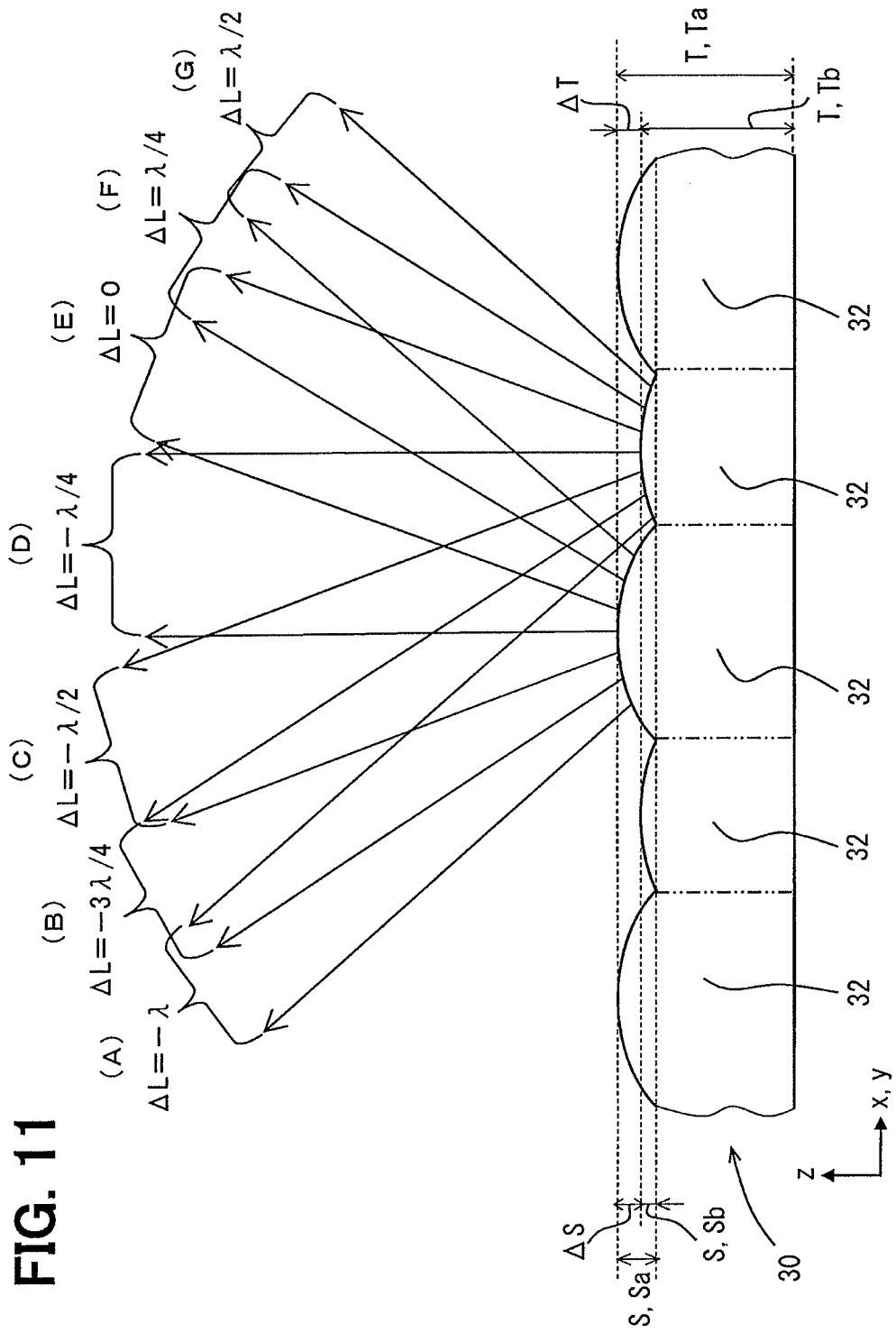
FIG. 11 is a diagram illustrating an optical path difference of emitted beams according to the first embodiment.

The optical path difference $\Delta L$ in the first embodiment is generated as shown in FIG. 11, for example. When a refractive index of the optical element 32 (or screen 30) is defined as "n" under the approximation of $\sin \theta \approx \theta$ [rad], the optical path difference $\Delta L$ is represented by a numerical formula 3 and a numerical formula 4 as provided below using the peak pitch P (refer to FIGS. 5 and 6) that is sufficiently greater than the $\Delta T$. Specifically, the numerical formula 3 is satisfied between one optical element 32 with the thicker thickness Ta and the other optical element 32 with the thinner thickness Tb on one side (e.g., a right direction in FIG. 6) of the one optical element 32. Whereas, the numerical formula 4 is satisfied between the one optical element 32 with the thicker thickness Ta and the other optical element 32 with the thinner thickness Tb on the other side (e.g., a left direction in FIG. 6) of the one optical element 32. Further, the angle difference α is represented by a numerical formula 5 as provided below using the peak pitch P, as with the comparative example.

$$\Delta L = P \cdot \theta - (n-1) \cdot \Delta T \quad \text{[Numerical Formula 3]}$$

$$\Delta L = P \cdot \theta + (n-1) \cdot \Delta T \quad \text{[Numerical Formula 4]}$$

$$\alpha = \frac{\lambda}{P} \quad \text{[Numerical Formula 5]}$$

Figure 12:
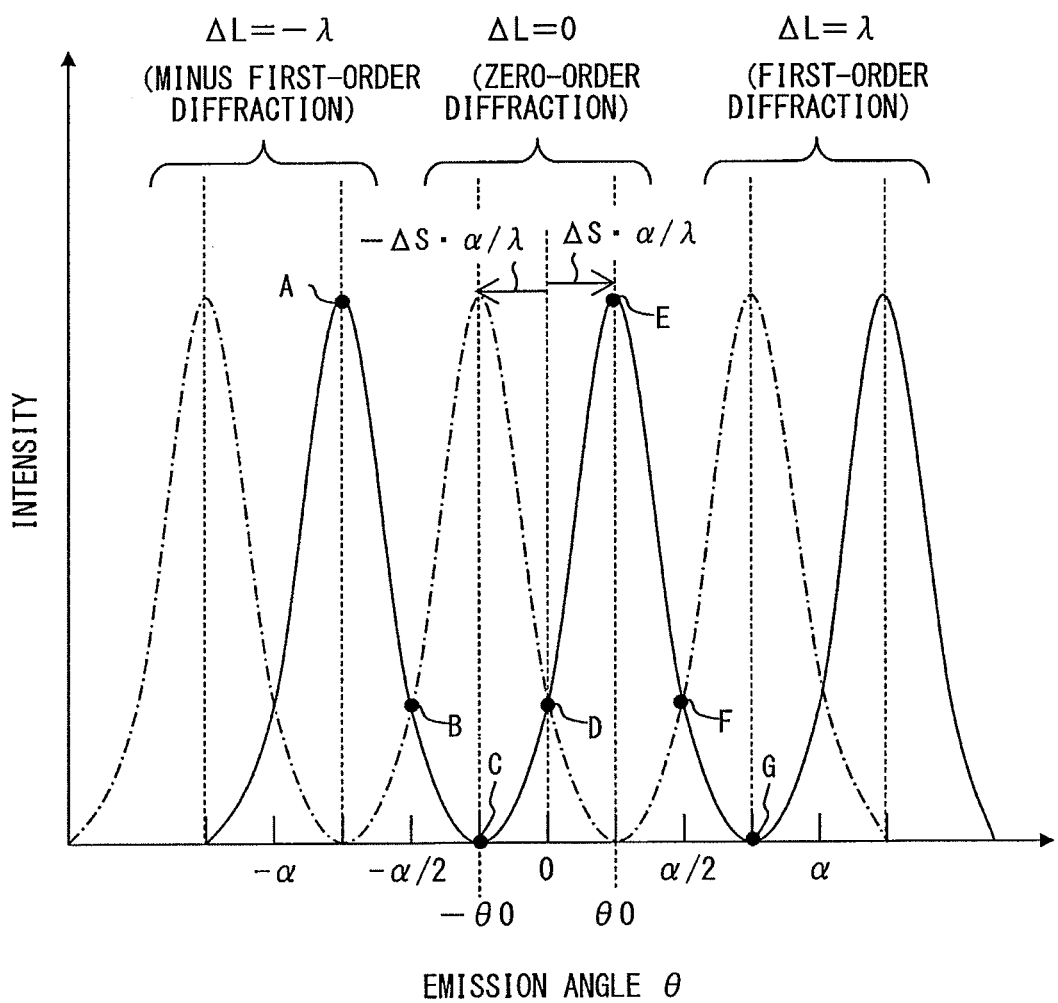
FIG. 12 is a diagram illustrating an intensity distribution of diffracted lights according to the first embodiment.

FIG. 12 shows intensity distributions of the first embodiment having the optical path difference ΔL of −λ, 0, +λ (i.e., the order of the diffraction peak of −1, 0, +1) based on the numerical formulas 3, 4 and 5. As shown in FIG. 12, the intensity distributions depend on the angle difference α of the emission angle θ. In one intensity distribution (see a solid line in FIG. 12), a center of the diffraction peak by one optical element 32 having the thicker thickness Ta and the other optical element 32 having the thinner thickness Tb on one side of the one optical element 32 is shown according to the numerical formulas 3 and 5 when the emission angle θ is at a zero order diffraction angle θ0, which is Shifted by +ΔT·α/λ from 0, θ0−α, θ0+α. Whereas, in the other intensity distribution (see an one-dot dashed line in FIG. 12), a center of the diffraction peak by the optical element 32 having the thicker thickness Ta and the other optical element 32 having the thinner thickness Tb on the other side of the one optical element 32 is shown according to the numerical formulas 4 and 5 when the emission angle θ is at a zero order diffraction angle −θ0, which is shifted by −ΔT·α/λ from 0, −θ0−α, −θ0+α. It should be noted that FIG. 12 shows an example where the centers of the diffraction peaks are shown at each θ0=α/4, α/4+α, α/4−α and each −θ0=−α/4, −α/4+α, −α/4−α by setting ΔT={1/(n−1)}·λ/4. Further, points A to G indicated on the solid line of FIG. 12 correspond to directions A to G of the diffracted lights generating the optical path differences ΔL as shown in FIG. 11.

Figure 13:
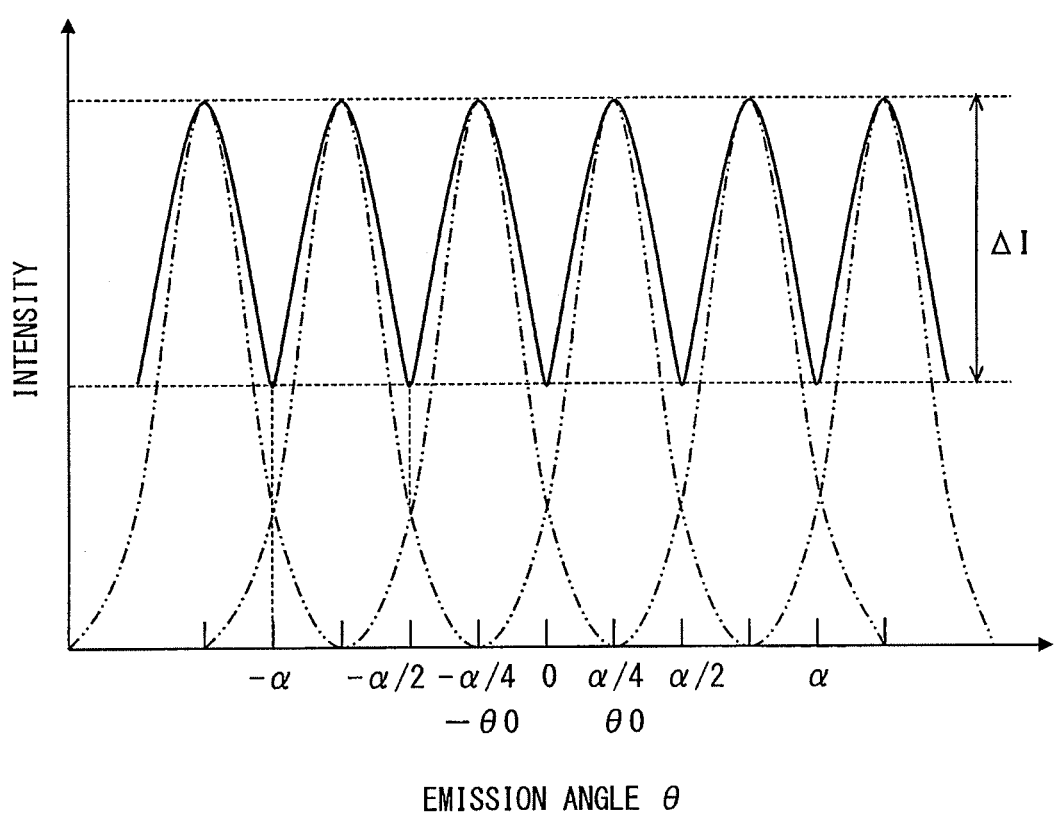
FIG. 13 is a diagram illustrating a superposition of the diffracted lights according to the first embodiment.

As described above, the diffraction peaks of the diffracted lights generated by the one optical element 32 and the other optical elements 32 on both sides of the one optical element 32 are generated at the different emission angles θ, that is, the diffraction peaks are shifted each other. As a result, the diffraction peaks generated by the one optical element 32 and the other optical element 32 on one side of the one optical element 32 are superposed with the diffraction valleys generated by the one optical element 32 and the other optical element 32 on the other side of the one optical element 32, FIG. 13 shows an intensity distribution (a solid line in FIG. 13) by superposing the diffracted lights (two-dot dashed lines) generated by one optical element 32 and the other optical elements 32 on both sides of the one optical element 32. An intensity difference ΔI between the centers of the diffraction peaks at emission angles θ (i.e., θ0, θ0+α, θ0−α, −θ0, −θ0+α, −θ0−α, etc.) and the other emission angles θ is decreased. For example, when ΔT={1/(n−1)}·λ/4 is set in FIG. 13 as with in FIG. 12, the intensity difference ΔI decreases between the centers of the diffraction peaks when the emission angle θ is at α/4, α/4+α/2, α/4−α/2, −α/4, −α/4+α/2, −α/4−α/2, etc. and the lowest points when the emission angle θ is at 0, 0−α/2, 0+α/2, etc. Therefore, the viewer can be suppressed to feel the luminance irregularity because of the decreased intensity difference ΔI.

Figure 14:
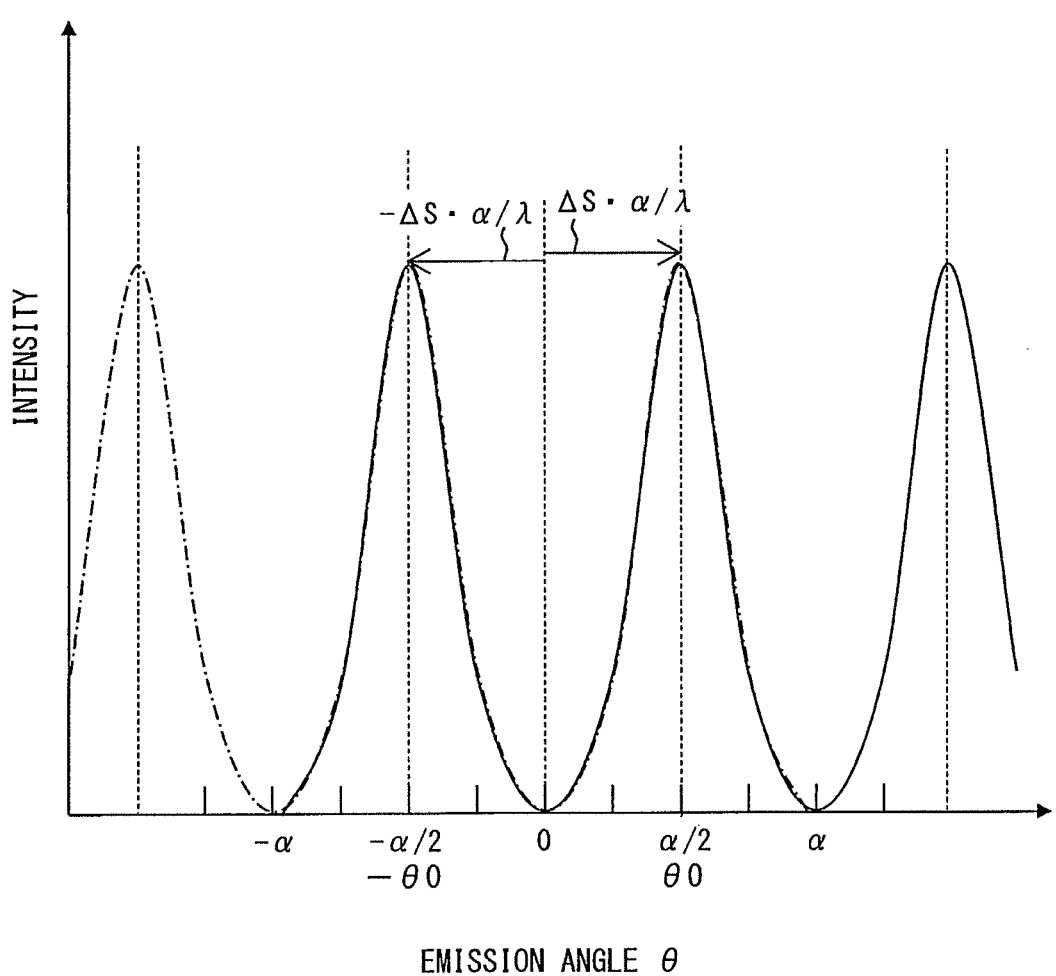
FIG. 14 is a diagram illustrating a superposition when a difference Δt is a specific value according to the first embodiment.

As described above, in the first embodiment, the laser beam is diffused by and emitted from each optical element 32 when the laser beam passes through the curved surface 33. Under the configuration, when an odd numerical value equal to or more than 1 is defined as "m" and a difference ΔT between the thicknesses of the adjacent optical elements 32 is equal to {1/(n−1)}·m·λ/2, the diffraction peaks generated by one optical element 32 and the other optical elements 32 on both sides of the one optical element 32 may be superposed each other as shown in FIG. 14. This is because, when ΔT={1/(n−1)}·m·λ/2 (where ΔT=λ/2 in FIG. 14) is satisfied, the diffraction peaks are shown at θ0=α/2, α/2+α, α/2−α, θ0=−α/2, −α/2+α, −α/2−α, etc.

According to the first embodiment, however, the difference ΔT of the thicknesses of the adjacent optical elements 32 is set to satisfy a numerical formula 6 as provided below. Further, the difference ΔT preferably satisfies a numerical formula 7. Even more preferably, the difference ΔT satisfies a numerical formula 8, as far as the numerical formula 6 is satisfied.

$$\Delta T \neq \frac{1}{n-1} \cdot m \cdot \frac{\lambda}{2} \quad \text{[Numerical Formula 6]}$$

$$\frac{2m-1}{n-1} \cdot \frac{\lambda}{8} < \Delta T < \frac{2m+1}{n-1} \cdot \frac{\lambda}{8} \quad \text{[Numerical Formula 7]}$$

$$\Delta T = \frac{1}{n-1} \cdot m \cdot \frac{\lambda}{4} \quad \text{[Numerical Formula 8]}$$

It should be noted that, in the first embodiment in which the laser beams of the plural colors are used, the wavelength λ in the numerical formulas 6, 7 and 8 is set for at least one of the laser beams. For example, the wavelength λ may be preferably set to a peak wavelength of the green laser beam having a high visibility or a peak wavelength of the red laser beam having a large diffraction angle, when the wavelength λ is set for only one laser beam with a color. When the wavelength λ is set for two or more laser beams with different colors, the numerical formulas 6, 7 and 8 are satisfied by setting "m" to a different value on each color of the laser beam in consideration of the refractive index corresponding to each color.

Especially, when the wavelength λ is set for the peak wavelength of the green laser beam, the difference ΔT [nm] is set a value that satisfies the numerical formula 9 based on the numerical formula 6, preferably the numerical formula 10 based on the numerical formula 7, more preferably the numerical formula 11 based on the numerical formula 8, as provided below.

$$\Delta T \neq \frac{1}{n-1} \cdot m \cdot \frac{490}{2} \sim \frac{1}{n-1} \cdot m \cdot \frac{530}{2} \quad \text{[Numerical Formula 9]}$$

$$\frac{2m-1}{n-1} \cdot \frac{490}{8} < \Delta T < \frac{2m+1}{n-1} \cdot \frac{530}{8} \quad \text{[Numerical Formula 10]}$$

$$\Delta T = \frac{1}{n-1} \cdot m \cdot \frac{490}{4} \sim \frac{1}{n-1} \cdot m \cdot \frac{530}{4} \quad \text{[Numerical Formula 11]}$$

Whereas, when the wavelength λ is set for the peak wavelength of the red laser beam, the difference ΔT [nm] is set a value that satisfies the numerical formula 12 based on the numerical formula 6, preferably the numerical formula 13 based on the numerical formula 7, more preferably the numerical formula 14 based on the numerical formula 8, as provided below.

$$\Delta T \neq \frac{1}{n-1} \cdot m \cdot \frac{600}{2} \sim \frac{1}{n-1} \cdot m \cdot \frac{650}{2} \quad \text{[Numerical Formula 12]}$$

$$\frac{2m-1}{n-1} \cdot \frac{600}{8} < \Delta T < \frac{2m+1}{n-1} \cdot \frac{650}{8} \quad \text{[Numerical Formula 13]}$$

$$\Delta T = \frac{1}{n-1} \cdot m \cdot \frac{600}{4} \sim \frac{1}{n-1} \cdot m \cdot \frac{650}{4} \quad \text{[Numerical Formula 14]}$$

It should be noted that, when a lower limit value or a lower limit numerical formula is defined as "MIN" and a upper limit value or a upper limit numerical formula is defined as "MAX", a scope of "MIN~MAX" recited in the present description represents a scope including "MIN" and "MAX", that is, a scope "equal to or more than MIN and equal to or less than MAX".

According to the first embodiment in which either one of the numerical formula 6, 10 or 11 is satisfied, the difference $\Delta T$ as to at least one laser beam with a color is shifted from $\{1/(n-1)\} \cdot m \cdot \lambda/2$, and thus the diffraction peaks can be prevented from superposing each other. It should be noted that the difference $\Delta T$ is illustrated in FIG. 6 to be much greater than actual difference for easy understanding.

The inventors of the present embodiment further has found another knowledge that when the laser beam is emitted through the boundary 35 between the adjacent optical elements 32, the emitting laser beam has an intensity distribution fluctuating according to the emission angle due to the diffraction at the boundary 35, and as a result of the boundary diffraction (opening diffraction), the luminance irregularity may be also induced.

In view of the above, the optical element 32 according to the first embodiment is configured such that element widths W on cross-sectional planes, which respectively extend along the directions x and y and include the apex 34, are different between the adjacent optical elements 32, as shown in FIGS. 5 and 6. More specifically, the element width W according to the first embodiment includes a large element width Wa and a small element width Wb that is less than the large element width Wa. The optical element 32 having the large element width Wa and the optical element 32 having the small element width Wb are alternately arranged in both the directions x and y. By this arrangement, the magnitude relationship of the element width W between the adjacent optical elements 32 in the horizontal direction x corresponds to that of the element width W between the adjacent optical elements 32 in the perpendicular direction y.

Figure 15:
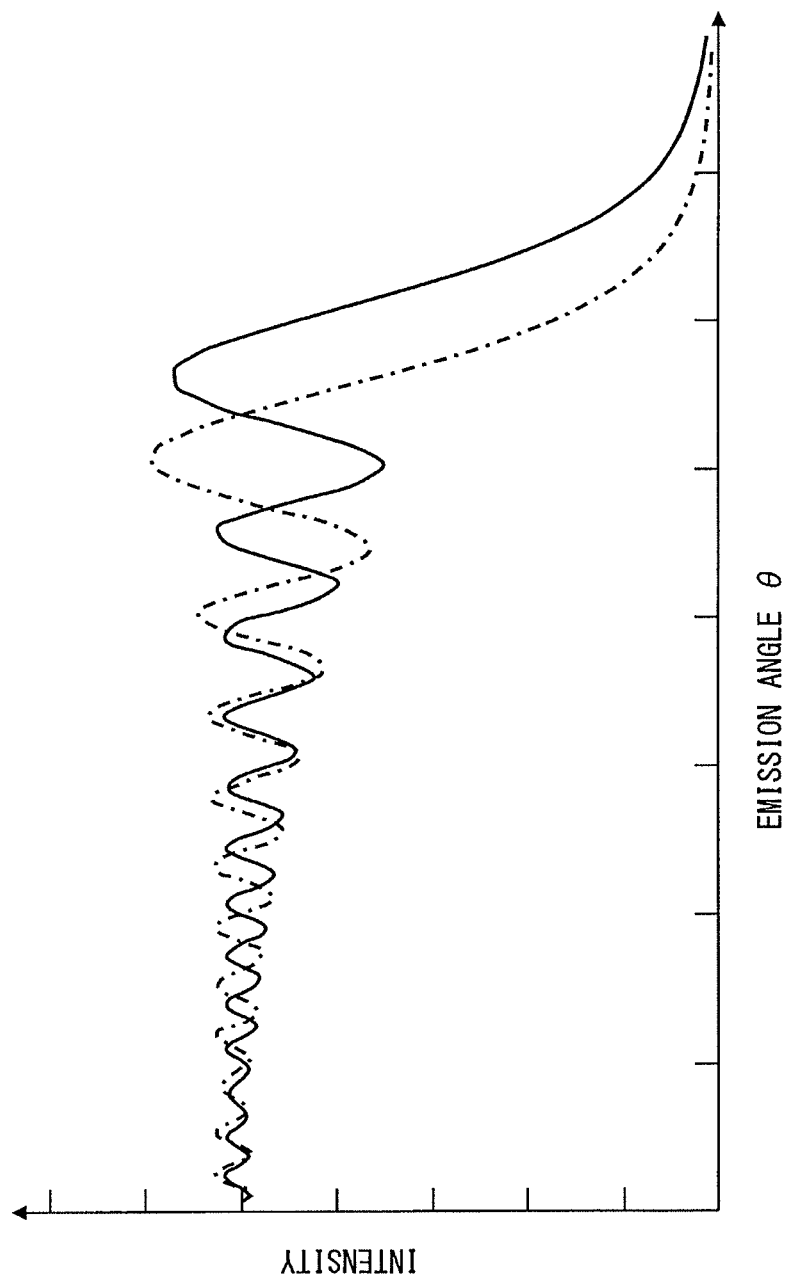
FIG. 15 is a diagram illustrating the intensity distributions of the emitted beams according to the first embodiment.
Figure 16:
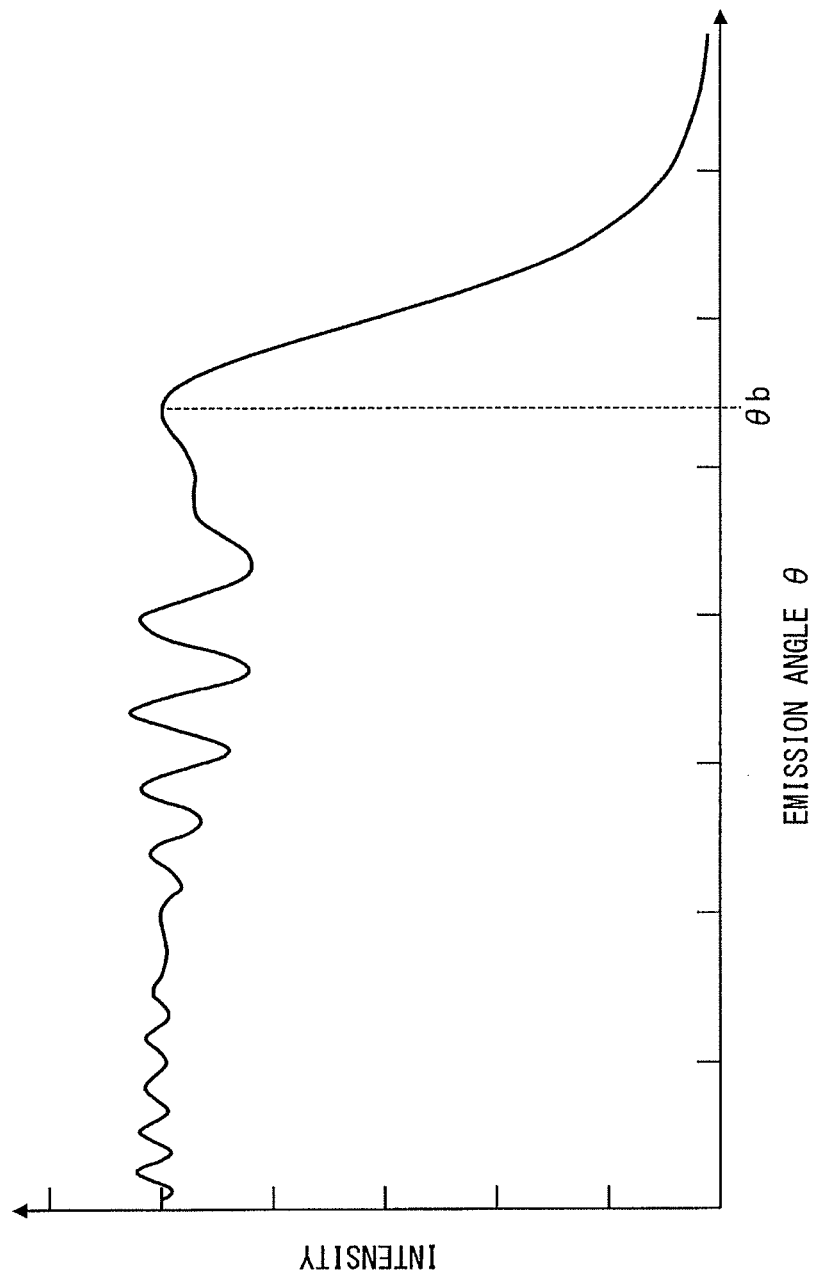
FIG. 16 is a diagram illustrating a superposition of the emitted beams according to the first embodiment.

Therefore, as shown in FIG. 15, an intensity distribution of the optical element 32 having the large element width Wa (a solid line) and an intensity distribution of the optical element 32 having the small element width Wb (a one-dot dashed line) are shifted each other, whereby suppressing an increase in a peak strength. FIG. 16 shows an intensity distribution by superposing the laser beams emitted from the optical elements 32 having the large element width Wa and the small element width Wb. As shown in the FIG. 16, since the fluctuation around the emitting angle $\theta b$ corresponding to the boundary 35 is suppressed, the luminance irregularity can be also suppressed. According to the study by the inventors, it is preferably for suppressing the luminance irregularity to set a difference ratio of the element width Wa relative to the peak pitch P (corresponding to the average amount of the element widths Wa and Wb in the first embodiment) to be within scope of +3.5%~+5% and to set a difference ratio of the element width Wb relative to the peak pitch P to be within scope of −5%~−3.5%.

In order to realize the above-described features, the optical element 32 having the large sag amount Sa (i.e., the optical element 32 having the thicker thickness Ta) is configured to have the large optical element width Wa, as shown in FIG. 6. The optical element 32 having the small sag amount Sb (i.e., the optical element 32 having the thinner thickness Tb) is configured to have the small optical element width Wb. Furthermore, the curved surface 33 of each optical element 32 have a curvature radius, which is on the cross-sectional planes respectively including the apex 34 and extending along the directions x and y, and the curvature radius of each optical element 32 is the same. As shown in FIGS. 5 and 6, the peak pitches P in both the directions x and y are set to be the same over the entire screen 30. Furthermore, a doubled value of the peak pitch P is set to be equal to a sum of the large element width Wa and the small element width Wb (i.e., Wa+Wb) in both the directions x and b.

Figure 17:
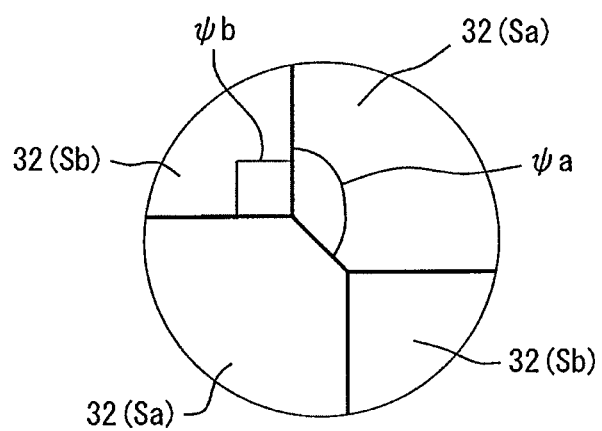
FIG. 17 is an enlarged view of FIG. 5.

Under the configuration, the optical element 32 having the small sag amount Sb has a square shape when viewed from the direction z as shown in FIG. 5 and is connected to four optical elements 32 having the large sag amount Sa at the boundaries 35 that extend linearly on the outside surface 31 of the screen 30. Thus, an internal angle $\psi b$ of each corner of the optical element 32 having the small sag amount Sb is set to be 90°, as shown in FIG. 17. Whereas, the optical element 32 having the large sag amount Sa has a substantially octagon shape formed by cutting four corners from a square shape when viewed from the direction z as shown in FIG. 5. Thus, the optical element 32 having the large sag amount Sa is connected to not only four optical elements 32 having the small sag amount Sb at the boundary 35 but also four optical elements 32 having the large sag amount Sa. Accordingly, an internal angle $\psi a$ of each corner of the optical element 32 having the large sag amount Sa is set to be 135°, as shown in FIG. 17.

(Operation and Effects)

An operation and effects according to the first embodiment will be described below.

The adjacent optical elements 32 according to the first embodiment emit the laser beams from the outside surface 31 through the curved surfaces 33 formed into the convex shape. Thus, the intensity distribution generated by the interference between the emitting laser beams has the diffraction peaks with plural orders according to the emission angles. However, in the first embodiment, since the thicknesses T of the adjacent optical elements 32 are different from each other, the diffraction peaks of the diffracted lights generated by one optical element 32 and the other optical elements 32 on both sides of the one optical element 32 are shifted each other. Using the shifting of the diffraction peaks, the diffraction peaks, which are generated by the one optical element 32 and the other optical element 32 on one side of the one optical element 32, is superposed with the diffraction valleys, which are generated by the one optical element 32 and the other optical element 32 on the other side of the one optical element 32, whereby suppressing the luminance irregularity.

Further, according to the first embodiment, the adjacent optical elements 32 having the different thickness Ta and Tb are formed over an entirety of the outside surface 31 of the screen 30. As a result, the shifting of the diffraction peaks can be attained without arranging the position of the optical elements 32 on the outside surface 31, and thus high suppression effect of the luminance irregularity can be achieved.

According to the first embodiment, since the difference $\Delta T$ of the thicknesses T (i.e., Ta−Tb) is not equal to $\{1/(n-1)\} \cdot m \cdot \lambda/2$, the superposition of the diffraction peaks can be prevented. Thus, the suppression effect of the luminance irregularity recognized by the viewer can be surely attained.

Especially, when the difference $\Delta T$ is equal to $\{1/(n-1)\} \cdot m \cdot \lambda/4$, the center of each diffraction valley of the diffracted lights can be superposed with the center of each diffraction peak of the diffracted lights, whereby surely attaining the suppression effect of the luminance irregularity recognized by the viewer.

Further, the difference $\Delta T$ of the adjacent optical elements 32 is equal to the difference $\Delta S$ of the sag amounts of the adjacent optical elements 32. As a result, the superposition of the diffraction peaks can be prevented, and thus the suppression effect of the luminance irregularity recognized by the viewer can be surely attained.

Furthermore, the superposition of the diffraction peaks is prevented in consideration of the peak wavelength $\lambda$ of the green laser beam between 490 to 530 nm, i.e., the peak wavelength $\lambda$ of the laser beam having the high visibility. Therefore, the suppression effect of the luminance irregularity recognized by the viewer can be enhanced. Alternatively, the superposition of the diffraction peaks is prevented in consideration of the peak wavelength $\lambda$ of the red laser beam between 600~650 nm, i.e., the peak wavelength $\lambda$ having the large diffraction angle. Therefore, the luminance irregularity that tends to be conspicuous at the large diffraction angle can surely be suppressed.

According to the first embodiment, the laser beams emitted through the boundary 35 between the adjacent optical elements 32 interfere with each other by diffraction. Therefore, even when the fluctuating intensity distributions of the emitting beams of the adjacent optical elements 32 are generated, the intensity distributions are shifted each other according to the difference of the element widths W (i.e., Wa−Wb). As a result, the emitting beams, which are emitted from the adjacent optical elements 32 and have the shifted intensity distribution each other, are recognized by the viewer as the virtual image 70, whereby further suppressing the luminance irregularity.

Furthermore, since the optical elements 32 are connected to each other at the linear boundary 35, an entrance loss of the laser beams into the eye point 61 and an occurrence of a ghost image due to the diffraction of the laser beams at the boundary 35 can be reduced.

(Second Embodiment)

Figure 18:
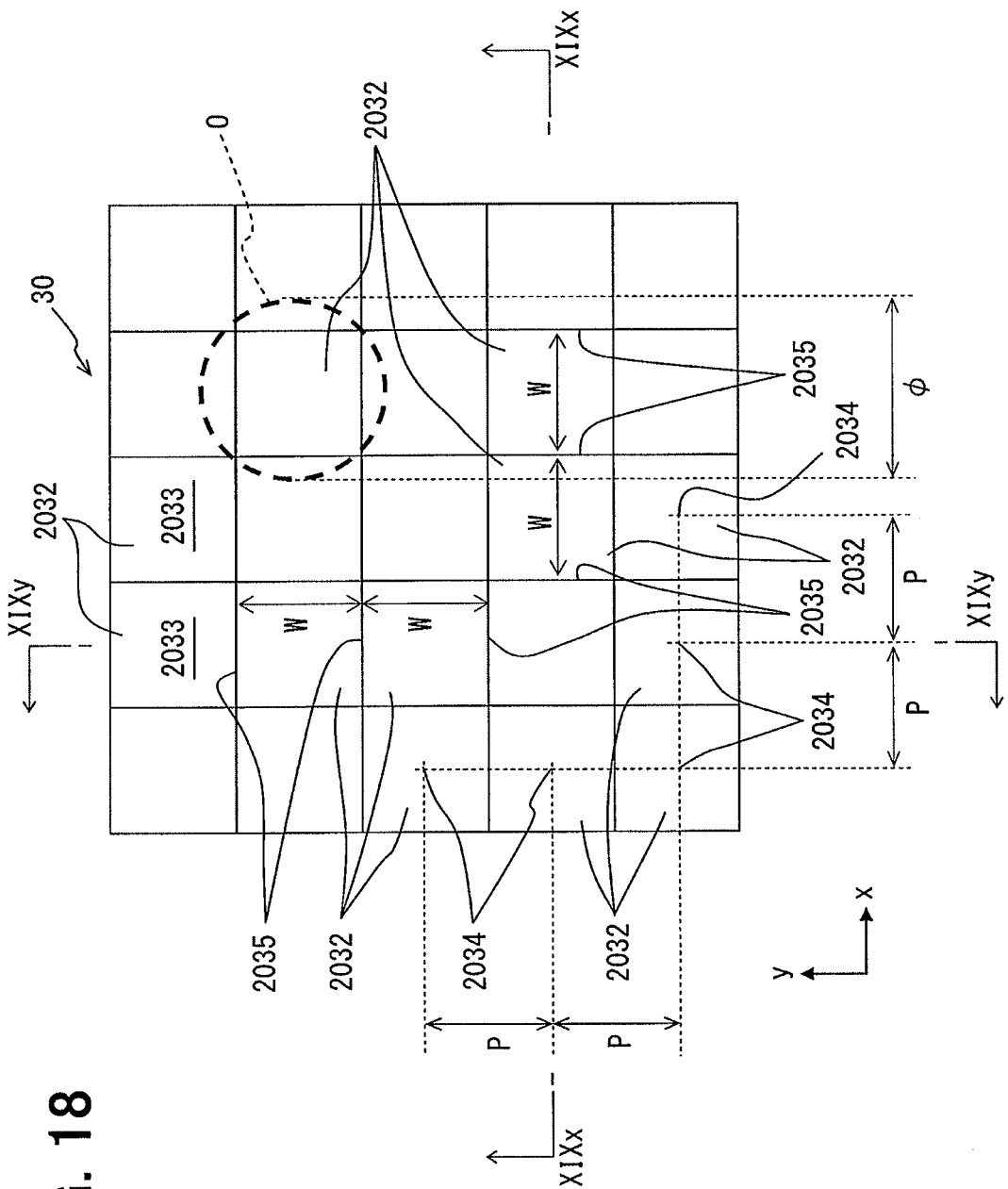
FIG. 18 is a diagram partially illustrating a screen according to a second embodiment.
Figure 19:
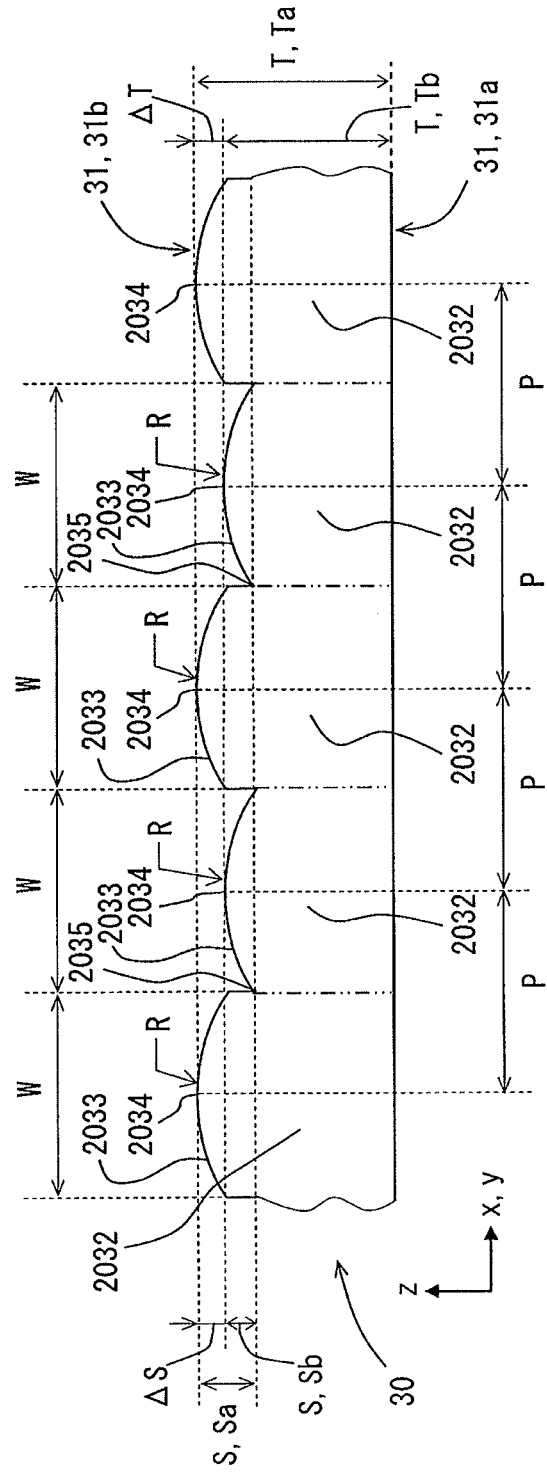
FIG. 19 is a cross-sectional view taken along the line XIXx-XIXx and the line XIXy-XIXy of FIG. 18 which partially illustrate the screen according to the second embodiment.

FIGS. 18 and 19 show the screen 30 according to the second embodiment, which is a modification to the first embodiment. In the second embodiment, the element widths W of respective optical elements 2032 in both the directions x and y are the same each other, i.e., each element width W is set to be equal to the peak pitch P. In other words, the optical elements 2032 having the uniform element width W are arranged at the peak pitch P in the horizontal direction x and the perpendicular direction y.

The adjacent optical elements 2032 according to the second embodiment have the different sag amounts 5, more specifically, the large sag amount Sa and the small sag amount Sb that is less than the large sag amount Sa by the difference $\Delta S$. Also, the optical elements 2032 have the curved surface 2033 with the same curvature radius R on the cross-sectional planes that respectively extend along the directions x and y and include the apex 2034 (i.e., curvature center point). It should be noted that, in the second embodiment, the sag amount S is defined as a difference (i.e., a depth) in the direction z (i.e., thickness direction) between the apex 2034 and a boundary 2035 between the adjacent optical elements 2032.

The optical element 2032 having the large sag amount Sa has a square shape viewed from the direction z as shown in, FIG. 18 and is connected to four optical elements 2032 having the small sag amount Sb at the boundaries 2035 that have a step shape as shown in FIG. 19. Further, the optical element 2032 having the small sag amount Sb has a square shape viewed from the direction z as shown in FIG. 18 and is connected to four optical elements 2032 having the large sag amount Sa at the boundary 2035 that has a step shape as shown in FIG. 19. In other words, one optical element 2032 is offset in the thickness direction of the one optical element 2032 relative to the other optical element 2032 immediately adjacent to the one optical element 2032.

As with the first embodiment, when the difference between the thicknesses T (i.e., the thicker thickness Ta and the thinner thickness Tb) of the adjacent optical elements 2032 at the apex 2034 is defined as $\Delta T$, $\Delta T = \Delta S$ is substantially satisfied.

According to the second embodiment, the boundary 2035 is formed into the step shape (i.e., offset shape), and thus the positions of the apexes 2034 of the adjacent optical elements 2032 are offset each other in the direction z (i.e., the thickness direction). Thus, the adjacent optical elements 2032 have the different thicknesses T (the thicker thickness Ta and the thinner thickness Tb) each other, whereby suppressing the luminance irregularity. Further, the optical elements 2032 according to the second embodiment have the same curvature radius R and the same element width W. In other words, the curved surface 2033 of the one optical element 2032 has the curvature radius R that is equal to that of the curved surface 2033 of the other optical elements 2032. Further, the one optical element 2032 has the element width W that is equal to that of the other optical elements 2032. Therefore, the consistency of the diffusing scope of each laser beam from the optical element 2032 can be maintained, and thus the entrance loss of the laser beams into the eye point 61 can be suppressed.

(Third Embodiment)

Figure 20:
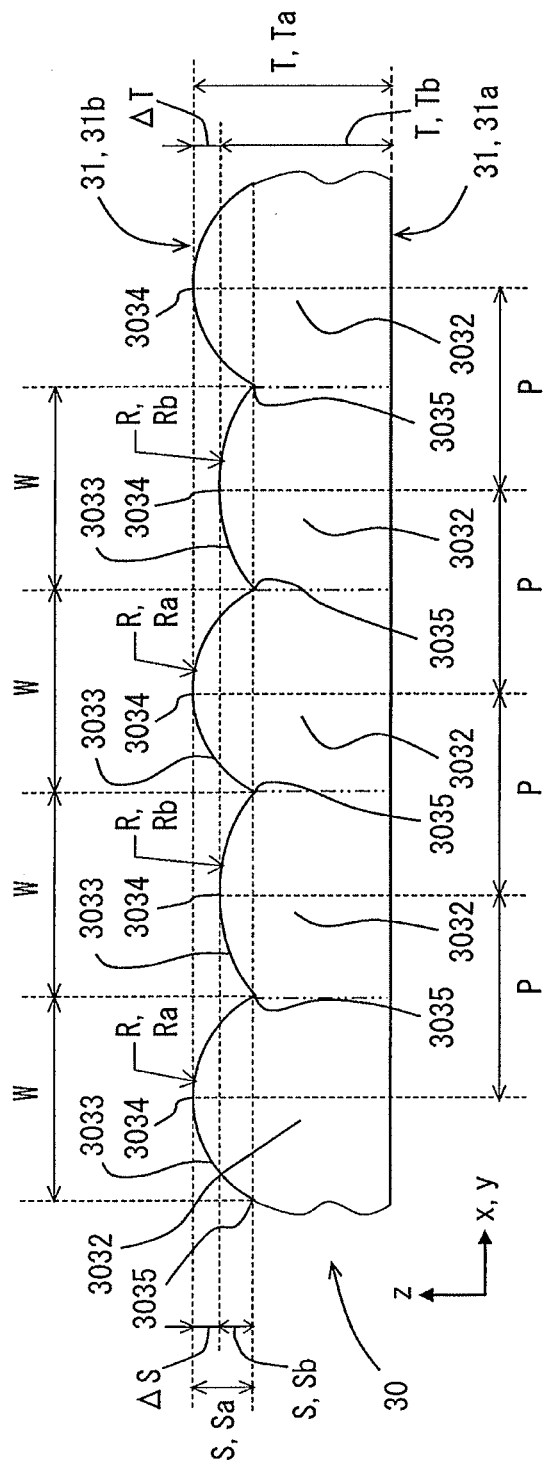
FIG. 20 is a diagram partially illustrating a screen according to a third embodiment.

FIG. 20 shows the screen 30 according to the third embodiment, which is a modification to the second embodiment. The adjacent optical elements 3032 have the same element width W equal to the peak pitch P and the different sag amounts S (the large sag amount Sa and the small sag amount Sb) each other. However, the optical element 3032 of the third embodiment has the curvature radius R set in a different manner as the second embodiment. More specifically, the adjacent optical elements 3032 have the curved surfaces 3033 with the different curvature radiuses R (i.e. a small curvature radius Ra and a large curvature radius Rb) each other. The optical element 3032 having the small curvature radius Ra and the optical element 3032 having the large curvature radius Rb are alternately arranged in both the directions x and y. Therefore, the magnitude relationship of the curvature radiuses R in the horizontal direction x are the same as the magnitude relationship of the curvature radiuses R in the perpendicular direction y. The optical element 3032 with the large sag amount Sa has the small curvature radius Ra and the optical element 3032 with the small sag amount Sb has the large curvature radius Rb.

The optical element 3032 having the large sag amount Sa has a square shape (not shown) viewed from the direction z and is connected to four optical elements 3032 having the small sag amount Sb at the boundary 3035 that extends linearly on the outside surface 31 of the screen 30. The optical element 3032 having the small sag amount Sb has a square (not shown) viewed from the direction z and is connected to four optical elements 3032 having the large sag amount Se at the boundary 3035 that extends linearly on the outside surface 31 of the screen 30.

As with the second embodiment, when the difference between the thicknesses T (i.e., the thicker thickness Ta and the thinner thickness Tb) of the adjacent optical elements 3032 at the apex 3034 (i.e., curvature center point) is defined as $\Delta T$, $\Delta T = \Delta S$ is substantially satisfied.

According to the third embodiment, the adjacent optical elements 3032 have the different curvature radius R, and thus the positions of the apexes 3034 of the adjacent optical elements 3032 are shifted each other in the direction z. Thus, the adjacent optical elements 3032 have the different thicknesses T (the thicker thickness Ta and the thinner thickness Tb) each other, whereby suppressing the luminance irregularity. Further, the optical elements 3032 according to the third embodiment are connected to each other at the linear boundary 3035. Thus, the entrance loss of the laser beams into the eye point 61 and the occurrence of the ghost image due to the diffraction of the laser beams at the boundary 3035 can be reduced.

(Fourth Embodiment)

Figure 21:
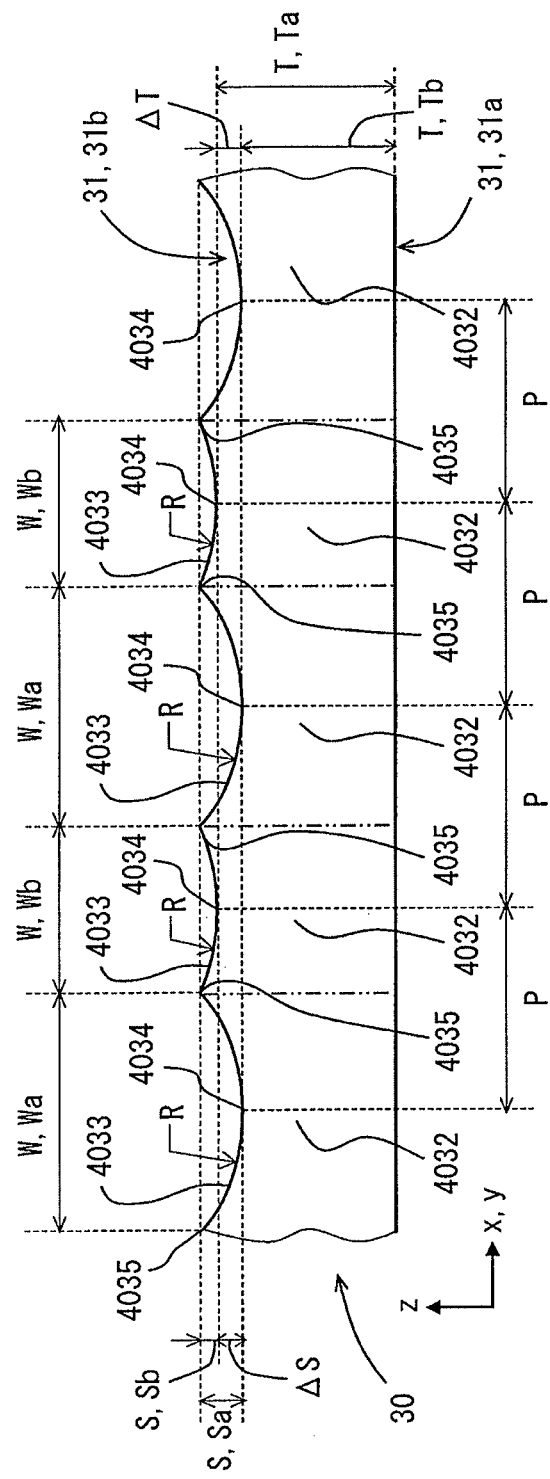
FIG. 21 is a diagram partially illustrating a screen according to a fourth embodiment.

FIG. 21 shows the screen 30 according to the fourth embodiment, which is a modification to the first embodiment. The optical elements 4032 of the fourth embodiment have the emitting surface 31b. Each emitting surface 31b has a curved surface 4033 that is formed into a concave shape. The curved surface 4033 is recessed away from the laser scanner 10 and the optical system 40 in the orthogonal direction z and has a deepest point 4034 (i.e., curvature center point). The adjacent optical elements 4032 form a boundary 4035 therebetween by overlapping a peripheral edge (i.e., an outline) of the optical elements 4032 each other. In the fourth embodiment, a difference between the deepest point 4034 and the boundary 4035 (i.e., an infection point in a sectional view) in the direction z (i.e., thickness direction) is defined as the sag amount S. As with the first embodiment, the sag amount S of the fourth embodiment includes the large sag amount Sa and the small sag amount Sb. The optical element 4032 having the large sag amount Sa and the optical element 4032 having the small sag amount Sb are alternately arranged in both the directions x and y.

Further, as with the first embodiment, the thickness T of the optical element 4032 includes the thicker thickness Ta and the thinner thickness Tb, and the optical element 4032 having the thicker thickness Ta and the optical element 4032 having the thinner thickness Tb are alternately arranged in both the directions x and y.

More specifically, the optical element 4032 with the large sag amount Sa has the thinner thickness Tb and the optical element 4032 with the small sag amount Sb has the thicker thickness Ta. Further, as with the first embodiment, when the difference between the thicknesses T (i.e., Ta−Tb) of the adjacent optical elements 4032 at the deepest point 4034 is defined as $\Delta T$, $\Delta T = \Delta S$ is substantially satisfied.

According to the fourth embodiment, the same operation and effects as the first embodiment can be attained since the fourth embodiment has the same configuration as the first embodiment except the above-described configurations.

(Fifth Embodiment)

Figure 22:
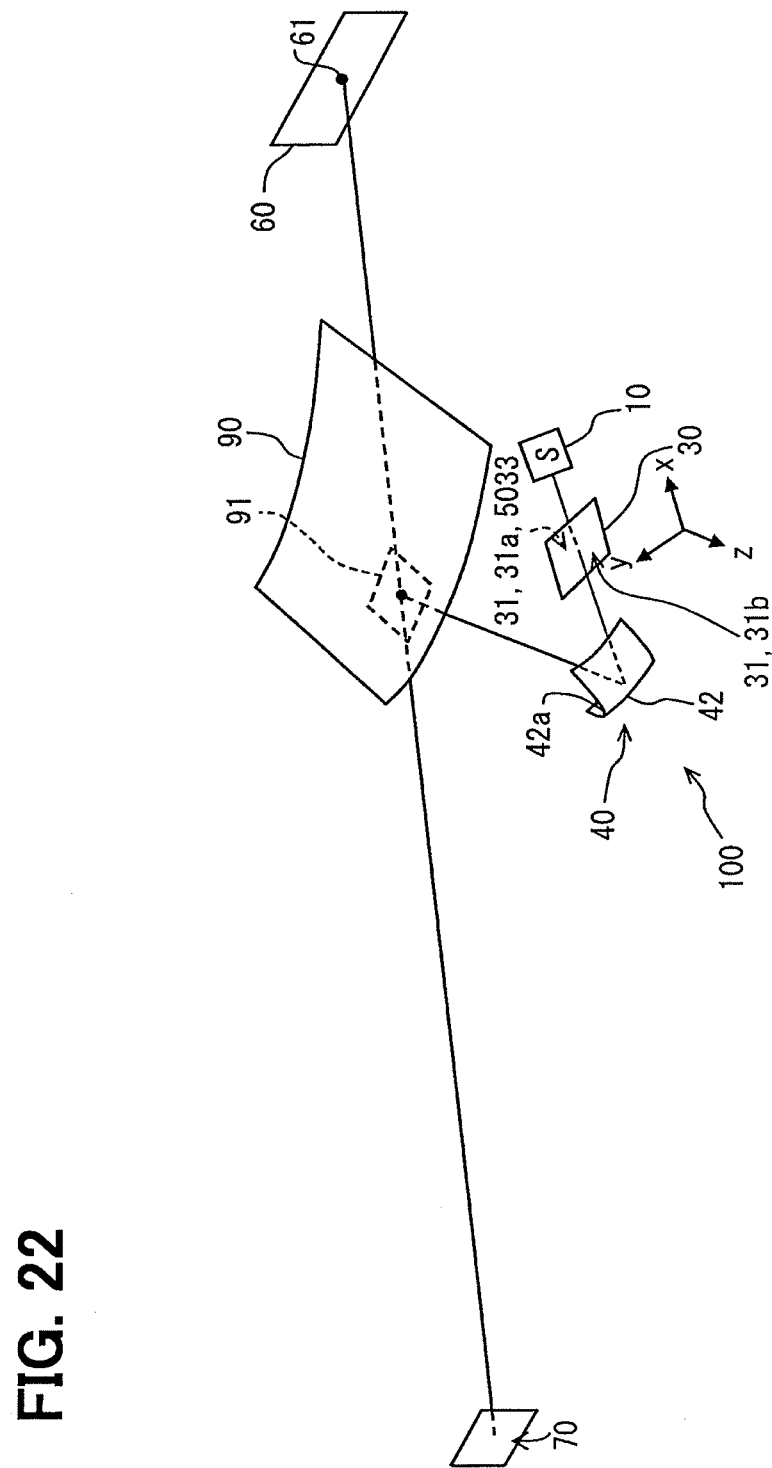
FIG. 22 is a diagram schematically illustrating a HUD apparatus according to a fifth embodiment.
Figure 23:
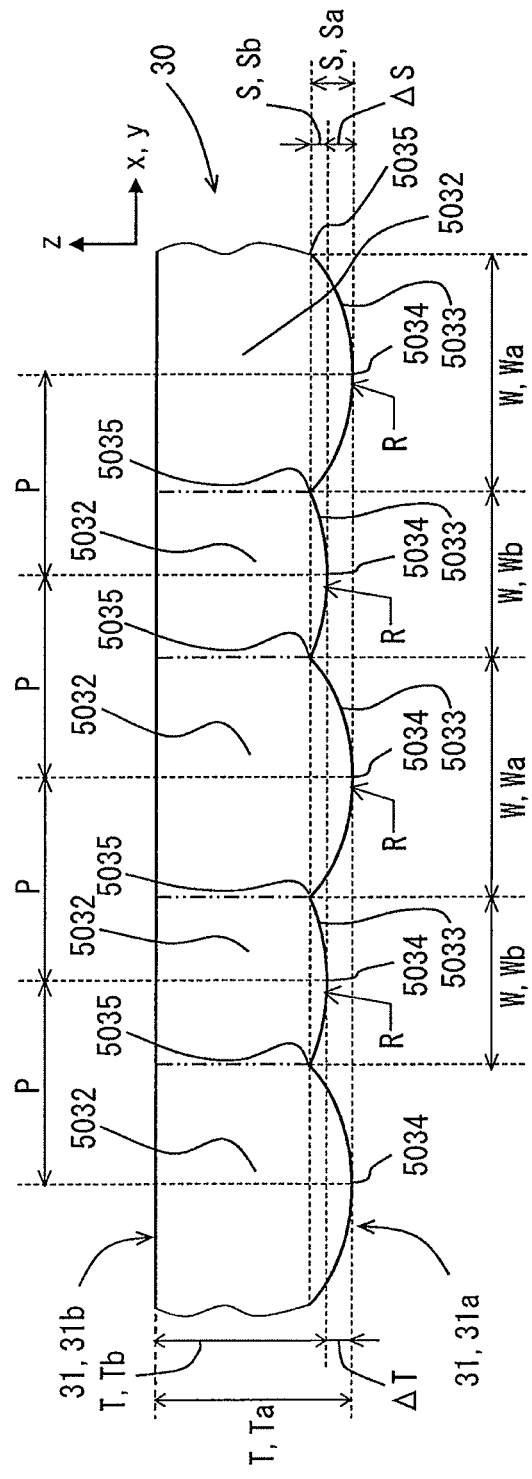
FIG. 23 is a diagram partially illustrating a screen according to the fifth embodiment.

FIGS. 22 and 23 show the fifth embodiment, which is a modification to the first embodiment. The optical element 5032 of the fifth embodiment has a curved surface 5033 of the outside surface 31. Each curved surface 5033 is formed into a convex shape. More specifically, the curved surface 5033 of the optical element 5032 is not formed on the emitting surface 31b but on the receiving surface 31a.

A step in the direction z is formed on the receiving surface 31a as the curved surface 5033 is formed on the receiving surface 31a. Therefore, when the difference between the thicknesses T (i.e., Ta−Tb) of the adjacent optical elements 5032 at the apex 5034 (i.e., curvature center point) is defined as $\Delta T$, $\Delta T = \Delta S$ is substantially satisfied.

In the fifth embodiment, the optical path difference $\Delta L$ between the laser beams, which are emitted from the adjacent optical elements 5032 and interfere with each other, is represented by the numerical formulas 3 and 4 as described in the first embodiment. Further, the angle difference $\alpha$ of the emission angle $\theta$ corresponding to a change amount of the optical path difference $\Delta L$ for the wavelength $\lambda$, i.e., corresponding to the change of one order of the diffraction peak generated by the interference of the laser beams, is represented by the numerical formula 5 as described in the first embodiment. It should be noted that, the calculations based on the first embodiment are applied as to the receiving surface 31a when calculating the numerical formulas 3, 4 and 5. Further, when the emission angle of the laser beam from the receiving surface 31a is defined as $\theta m$, $\sin \theta = n \cdot \sin \theta m$ is used in consideration of the refraction at the emitting surface 31b.

The difference $\Delta T$ between the adjacent optical elements 5032 is set to a value that satisfies the numerical formula 6 as described in the first embodiment. Further, as far as the numerical formula 6 is satisfied, the difference $\Delta T$ of the thicknesses of the adjacent optical elements 5032 is preferably set to a value satisfying the numerical formula 7 as described in the first embodiment, more preferably, a value satisfying the numerical formula 8 as described in the first embodiment.

According to the fifth embodiment, the same operation and effects as the first embodiment can be attained since the fifth embodiment has the same configuration as the first embodiment except the above-described configurations.

(Other Embodiments)

The plurality of embodiments are described above, but the present disclosure is not limited to the embodiments. Various embodiments and combinations thereof can be applied insofar as the embodiments and the combinations do not depart from the scope of the present disclosure.

Figure 24:
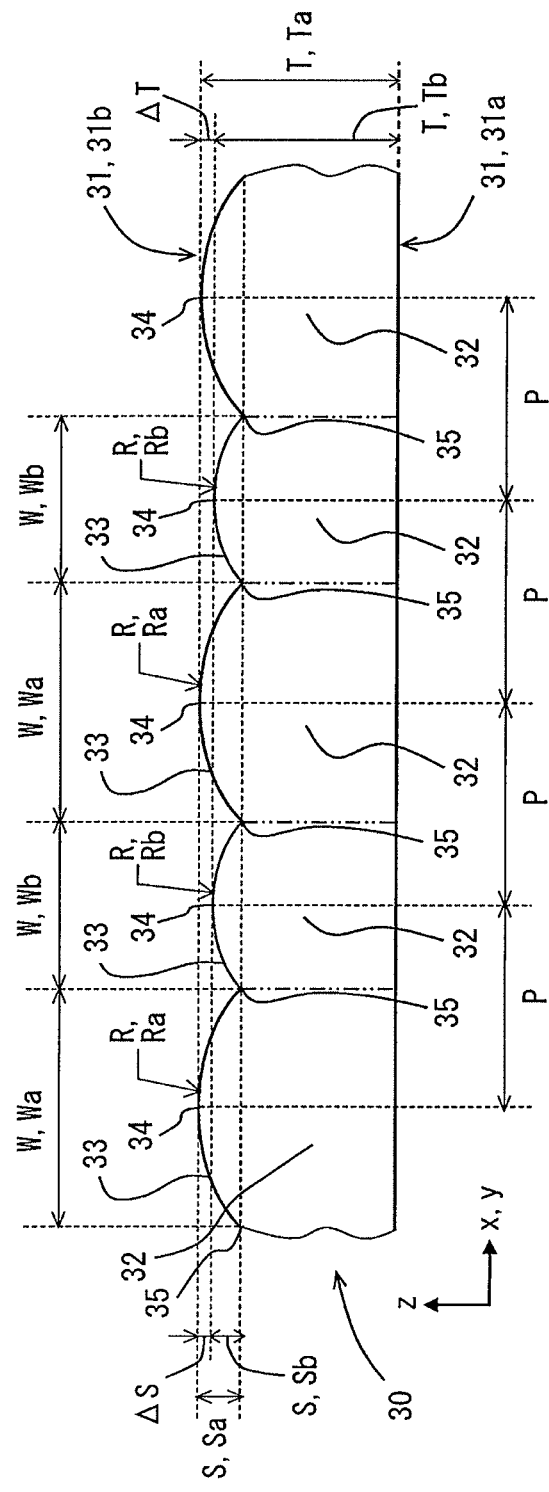
FIG. 24 is a diagram partially illustrating a screen according to a second modification.

As shown in FIG. 24 illustrating the screen 30 of a first modification to the first and the fifth embodiments, the adjacent optical elements 32 may have different curvature radiuses R (where Ra>Rb) according to the third embodiment.

Figure 25:
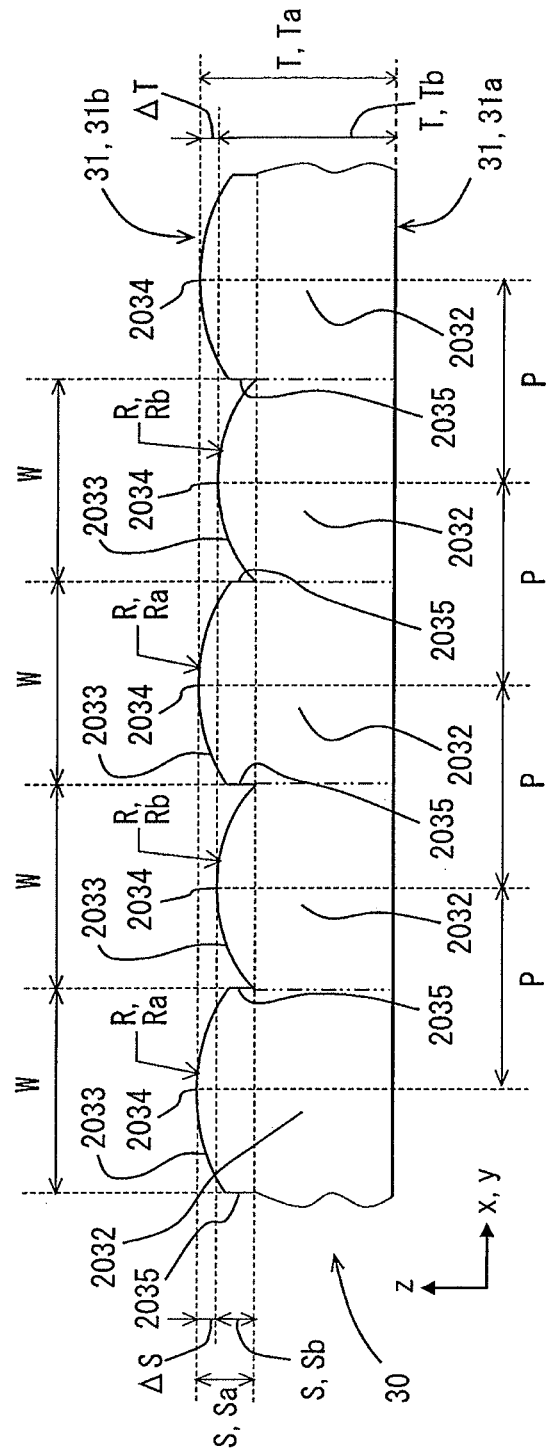
FIG. 25 is a diagram partially illustrating a screen according to a third modification.

As shown in FIG. 25 illustrating the screen 30 of a second modification to the second embodiment, the adjacent optical elements 2032 may have different curvature radiuses R (where Ra>Rb) according to the third embodiment.

Figure 26:
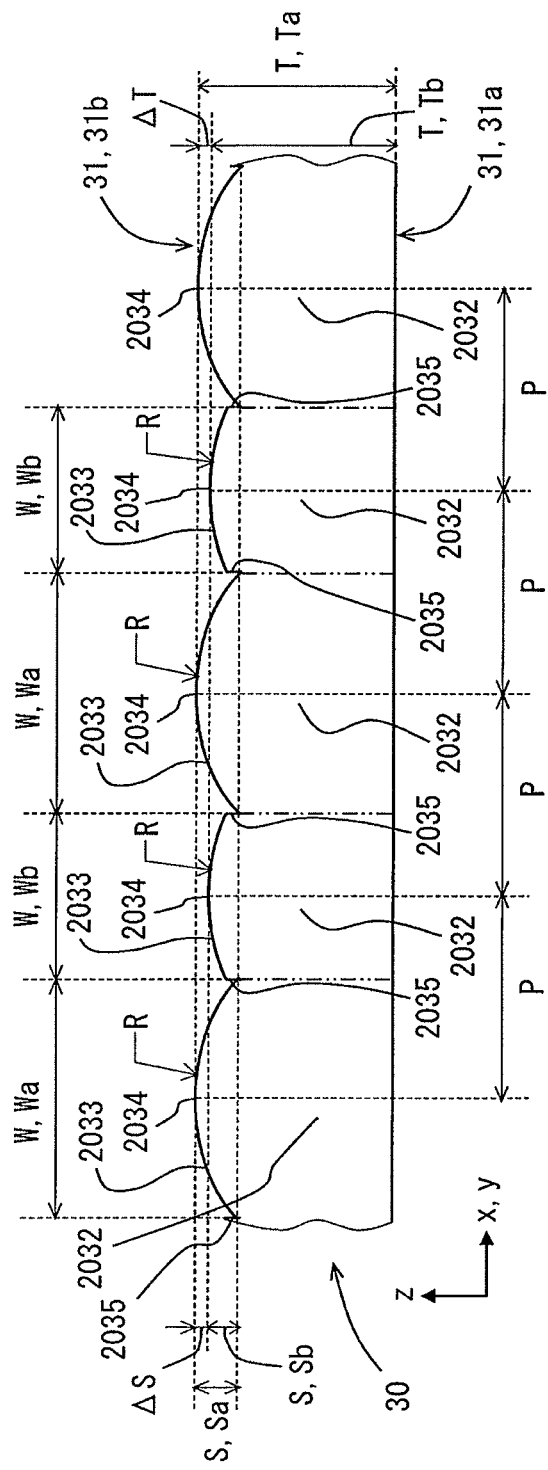
FIG. 26 is a diagram partially illustrating a screen according to a fourth modification.

Alternatively, as shown in FIG. 26 illustrating the screen 30 of a third modification to the second embodiment, the adjacent optical elements 2032 may have different element widths W (Wa, Wb) according to the first embodiment.

Figure 27:
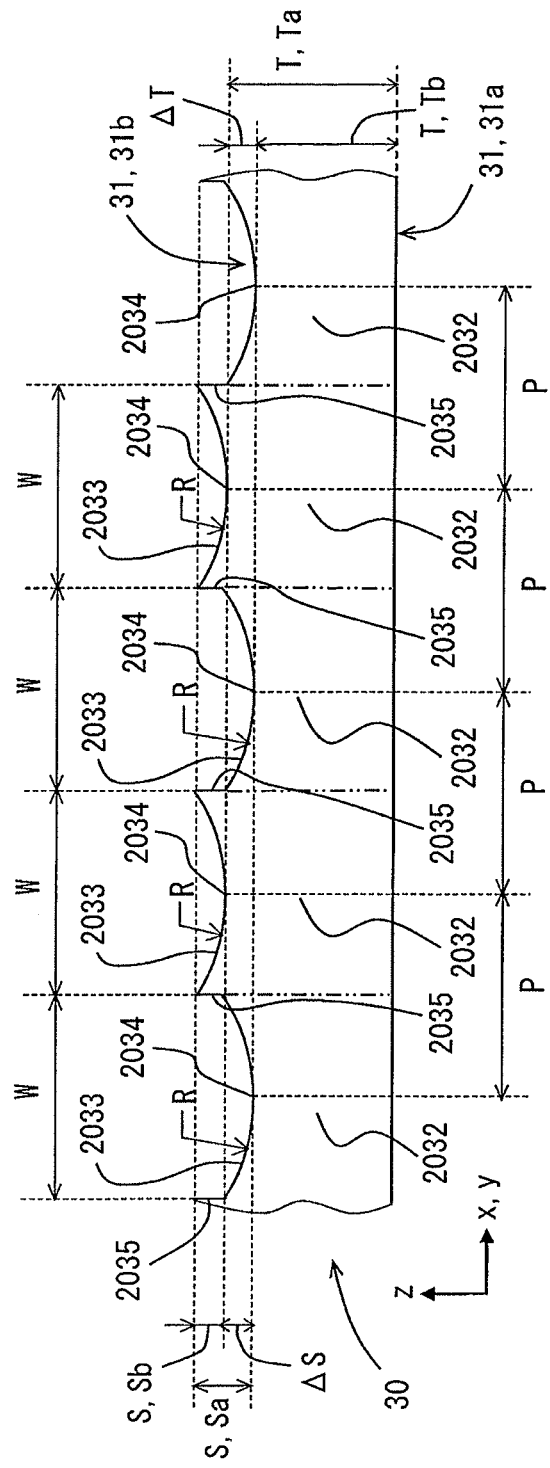
FIG. 27 is a diagram partially illustrating a screen according to a fifth modification.

As shown in FIG. 27 illustrating the screen 30 of a fourth modification to the second and the third embodiments, the optical element 2032 may have a curved surface 2033 formed into a concave shape according to the fourth embodiment. It should be noted that FIG. 27 shows the fourth modification to the second embodiment.

In a fifth modification to the first to the fifth embodiments, the optical element 32 (2032, 3032, 4032, 5032) may have different element widths W (Wa and Wb) in the directions x and y.

In a sixth modification to the first to the fifth embodiment, the optical element 32 (2032, 3032, 4032, 5032) may have different curvature radiuses R (Ra and Rb) in the directions x and y.

In a seventh modification to the first and the fifth embodiments, three or more kinds of the sag amounts S may be formed between the optical elements.

In an eighth modification to the first, the fourth and the fifth embodiments, the optical element may have three or more kinds of the element width W.

In an ninth modification to the first to the fifth embodiments, a scanning mirror rotatable around two axes may be used as the MEMS 26 of the laser scanner 10 serving as "projector".

In a tenth modification to the first to the fifth embodiments, another element other than the wind shield 90 may be used as "display portion" serving as the projection plane 91 of the vehicle 1. For example, a combiner which is attached on the wind shield 90 inside of the vehicle interior or is separately formed with the wind shield 90 may be used.

Figure 28:
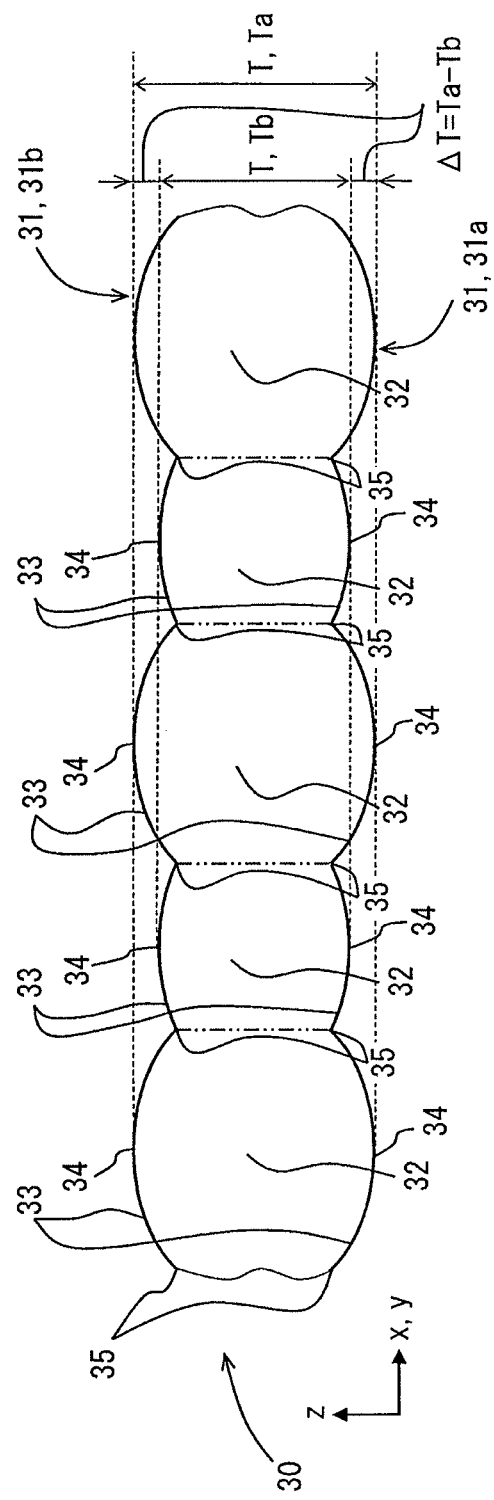
FIG. 28 is a diagram partially illustrating a screen according to an eleventh modification.

In an eleventh modification to the first to the fifth embodiments, the optical element 32 (2032, 3032, 4032, 5032) may have the curved surface 33 (2033, 3033, 4033, 5033) on both the receiving surface 31*a* and the emitting surface 31*b*. As shown in FIG. 28, the boundary 35 (2035, 3035, 4035, 5035) between the adjacent optical elements 32 (2032, 3032, 4032, 5032) are formed on both the receiving surface 31*a* and the emitting surface 31*b*. The boundary 35 on the receiving surface 31*a* is positioned corresponding to the boundary 35 on the emitting surface 31*b* in both the directions x and y.

Figure 29:
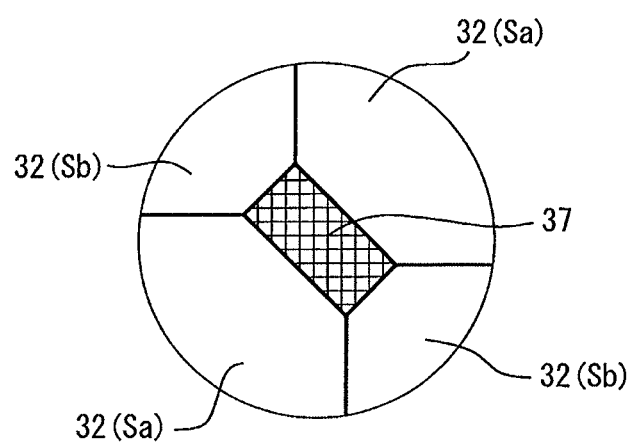
FIG. 29 is a diagram partially illustrating a screen according to a twelfth modification.

As shown in FIG. 29 illustrating the screen 30 of a twelfth modification to the first, the fourth and the fifth embodiments, the optical element 32 (4032, 5032) may have an substantially octagonal shape and a large sag amount Sa. The optical element 32 may be adjacent to four optical elements 32 (4032, 5032) having the large sag amount Sa through a flat portion 37 (indicated by hatching in FIG. 29). In this case, the optical element 32 (4032, 5032) having the small sag amount Sb is also adjacent to four optical elements 32 (4032, 5032) having the small sag amount Sb through the flat portion 37. It should be noted that FIG. 29 shows the modification 12 to the first embodiment.

Figure 30:
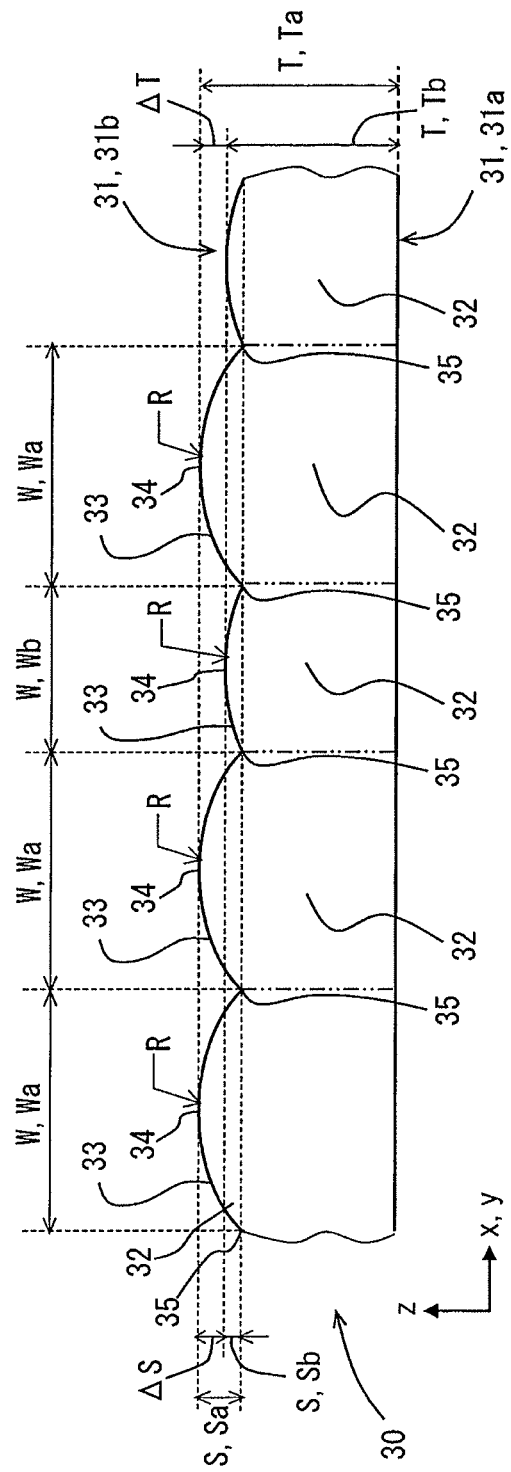
FIG. 30 is a diagram partially illustrating a screen according to a thirteenth and a fourteenth modification.

As shown in FIG. 30 illustrating the screen 30 of a thirteenth modification to the first to the fifth embodiments, the screen 30 may have a portion where the adjacent optical elements 32 (2032, 3032, 4032, 5032) have the different thicknesses T each other and a remaining portion where the same sag amount S is formed between the adjacent optical elements 32 (2032, 3032, 4032, 5032). It should be noted that FIG. 30 shows the thirteenth modification to the first embodiment.

Further, as shown in FIG. 30 also illustrating the screen 30 of a fourteenth modification to the first to the fifth embodiments, the screen 30 may have a portion where the adjacent optical elements 32 (2032, 3032, 4032, 5032) have the different element widths W each other and a remaining portion where all the optical elements 32 has the same element width S. It should be noted that FIG. 30 also shows the fourteenth modification to the first embodiment.

In a fifteenth modification to the first to the fifth embodiments, the present disclosure may be applied to various vehicles (i.e., transport body), such as an airplane, a vessel or the like, other than the automobile as described in the first embodiment.

What is claimed is:

1. A head-up display apparatus for displaying a virtual image of a display image by projecting the display image to a projection plane in an interior of a vehicle, the head-up display apparatus comprising:
    a projector projecting a light beam; and
    a screen including a plurality of optical elements that are arranged in a grid pattern on an outside surface of the screen, the screen diffusing the light beam projected from the projector toward the projection plane, wherein each of the plurality of optical elements has a curved surface having a convex or a concave shape, the light beam being diffused through the curved surface, one of the plurality of optical elements has a thickness at a curvature center point of the curved surface that is different from that of an other of the plurality of optical elements that is immediately adjacent to the one of the plurality of optical elements, the outside surface includes a receiving surface into which the light beam enters and an emitting surface from which the light beam is emitted, the curved surface is formed on at least one of the receiving surface and the emitting surface, m is defined as an odd numerical value greater than or equal to 1, λ is defined as a wavelength of the light beam, n is defined as a refractive index of the plurality of optical elements, a difference between the thickness of the one of the plurality of optical elements and the thickness of the other of the plurality of optical elements is defined as ΔT, and $$\Delta T \neq \frac{1}{n-1} \cdot m \cdot \frac{\lambda}{2}.$$

2. The head-up display apparatus according to claim 1, wherein $$\frac{2m-1}{n-1} \cdot \frac{\lambda}{8} < \Delta T < \frac{2m+1}{n-1} \cdot \frac{\lambda}{8}.$$

3. The head-up display apparatus according to claim 2, wherein $$\Delta T = \frac{1}{n-1} \cdot m \cdot \frac{\lambda}{4}.$$

4. The head-up display apparatus according to claim 1, wherein the curved surface is formed on the receiving surface or the emitting surface, the one of the plurality of optical elements is connected to the other of the plurality of optical elements at a boundary, each of the plurality of optical elements has a sag amount that is a distance from the curvature center point of the curved surface to the boundary in a thickness direction of the plurality of optical elements, and when a difference between the sag amount of the one of the plurality of optical elements and the sag amount of the other of the plurality of optical elements is defined as ΔS, ΔT =ΔS.

5. The head-up display apparatus according to claim 1, wherein the light beam includes a plurality of color laser beams, the plurality of color laser beams include a green color laser beam with a peak wavelength between 490 to 530 nm, and λ is the peak wavelength of the green color laser beam.

6. The head-up display apparatus according to claim 1, wherein the light beam includes a plurality of color laser beams, the plurality of color laser beams include a red color laser beam with a peak wavelength between 600 to 650 nm, and $\lambda$ is the peak wavelength of the red color laser beam.

7. The head-up display apparatus according to claim 1, wherein the one of the plurality of optical elements has a width that is different from that of the other of the plurality of optical elements.

8. The head-up display apparatus according to claim 1, wherein the one of the plurality of optical elements is connected to the other of the plurality of optical elements at a boundary that extends linearly on the outside surface of the screen.

9. The head-up display apparatus according to claim 1, wherein the one of the plurality of optical elements is offset in a thickness direction of the plurality of optical elements relative to the other of the plurality of optical elements at a boundary therebetween.

10. The head-up display apparatus according to claim 1, wherein the curved surface of the one of the plurality of optical elements has a curvature radius that is different from that of the curved surface of the other of the plurality of optical elements.

11. The head-up display apparatus according to claim 1, wherein the one of the plurality of optical elements is offset in a thickness direction of the plurality of optical elements relative to the other of the plurality of optical elements at a boundary therebetween, the curved surface of the one of the plurality of optical elements has a curvature radius that is equal to that of the curved surface of the other of the plurality of optical elements, and the one of the plurality of optical elements has a width that is equal to that of the other of the plurality of optical elements.

12. The head-up display apparatus according to claim 1, wherein the plurality of optical elements are formed over an entirety of the outside surface of the screen.

* * * * *